US012607152B2

(12) United States Patent
Remele et al.

(10) Patent No.: US 12,607,152 B2

(45) Date of Patent: Apr. 21, 2026

(54) METHOD AND DEVICE FOR OPERATING A GENERATOR SET, INTERNAL COMBUSTION ENGINE, AND GENERATOR SET INCLUDING THE INTERNAL COMBUSTION ENGINE AND A GENERATOR

(71) Applicant: Rolls-Royce Solutions GmbH, Friedrichshafen (DE)

(72) Inventors: Jörg Remele, Hagnau (DE); Andreas Krammer, Bodolz-Enzisweiler (DE); Andreas Flohr, Untersiggingen-Deggenhausertal (DE); Hendrik Weiss, Friedrichshafen (DE); Stefan Hecker, Schlier (DE); Jan Henker, Meckenbeuren (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 50 days.

(21) Appl. No.: 18/423,805

(22) Filed: Jan. 26, 2024

(65) Prior Publication Data

US 2024/0159195 A1 May 16, 2024

Related U.S. Application Data

(63) Continuation of application No. PCT/EP2022/070981, filed on Jul. 26, 2022.

(30) Foreign Application Priority Data

Jul. 26, 2021 (DE) ..................... 10 2021 119 327.3
Jul. 26, 2022 (WO) ................. PCT/EP2022/070981

(51) Int. Cl.
*F02D 29/00* (2006.01)
*F02D 29/06* (2006.01)

(52) U.S. Cl.
CPC ........ *F02D 29/06* (2013.01); *F02D 2200/101* (2013.01); *F02D 2250/18* (2013.01)

(58) Field of Classification Search
CPC ............... F02D 29/06; F02D 2200/101; F02D 2250/18; H02P 9/04; H02J 2300/10; H02J 3/38; H02J 3/42
See application file for complete search history.

(56) References Cited

U.S. PATENT DOCUMENTS 6,778,899 B2 8/2004 Weimer et al.
7,915,868 B1 3/2011 Maters et al.
(Continued)

FOREIGN PATENT DOCUMENTS

DE 10 2015 207 051 A1 10/2016
DE 10 2018 115 782 A2 1/2020
(Continued)

OTHER PUBLICATIONS

International Search Report and Written Opinion dated Nov. 24, 2022 for International Application No. PCT/ EP2022/070981 (14 pages).
(Continued)

*Primary Examiner* — Julio C. Gonzalez
(74) *Attorney, Agent, or Firm* — TAYLOR & EDELSTEIN, PC

(57) ABSTRACT

A method for operating a generator set includes: operating the generator set in synchronized manner to a power grid, which includes: synchronizing a generator voltage with a grid voltage; matching a generator voltage frequency and/or a generator voltage phase with a grid frequency and/or a grid voltage phase; operating generator set in synchronization mode to synchronize the generator voltage phase with the grid voltage phase; operating an engine in a phase control mode with adjustment of an engine phase to change the
(Continued)

generator voltage phase; transmitting the grid voltage phase to a phase regulator; regulating, by the phase regulator, the engine phase to a phase difference, which is created by a difference between the generator voltage phase and the grid voltage phase; and setting a phase parameter formed as the combustion control variable for torque-forming combustion setting of the engine, to adjust the engine phase subject to the phase difference.

22 Claims, 10 Drawing Sheets

(56) References Cited

U.S. PATENT DOCUMENTS

| | | | | |
|---|---|---|---|---|
| 9,755,564 | B2 | 9/2017 | Ono | |
| 10,181,728 | B2 * | 1/2019 | Shakeel | H02J 3/42 |
| 2004/0008010 | A1 * | 1/2004 | Ebrahim | H02P 9/04<br>322/44 |
| 2010/0148588 | A1 | 6/2010 | Algrain | |
| 2014/0058646 | A1 * | 2/2014 | Shimada | F02D 41/1462<br>701/104 |
| 2019/0323439 | A1 | 10/2019 | Attia et al. | |

FOREIGN PATENT DOCUMENTS

| | | | |
|---|---|---|---|
| WO | 2004/073137 | A1 | 8/2004 |
| WO | 2012/101318 | A1 | 8/2012 |
| WO | 2013/139862 | A2 | 9/2013 |

OTHER PUBLICATIONS

Wikipedia definition of "Synchronoscope" downloaded from https://de.wikipedia.org/wiki/Synchronoskop on Jan. 24, 2024 (5 pages).

"Preparing to synchronize a generator with grid" downloaded from https://crushtymks.com/energy-and-power/388-preparing-to-synchronize-a-generator-to-the-grid.html on Jan. 24, 2024 (7 pages).

* cited by examiner

300, GenSet

METHOD AND DEVICE FOR OPERATING A GENERATOR SET, INTERNAL COMBUSTION ENGINE, AND GENERATOR SET INCLUDING THE INTERNAL COMBUSTION ENGINE AND A GENERATOR

CROSS REFERENCE TO RELATED APPLICATIONS

This is a continuation of PCT application no. PCT/EP2022/070981, entitled "METHOD AND DEVICE FOR OPERATING A GENERATOR SET, INTERNAL COMBUSTION ENGINE, AND GENERATOR SET COMPRISING THE INTERNAL COMBUSTION ENGINE AND GENERATOR", filed Jul. 26, 2022, which is incorporated herein by reference. PCT application no. PCT/EP2022/070981 claims priority to German patent application no. 10 2021 119 327.3, filed Jul. 26, 2021, which is incorporated herein by reference.

BACKGROUND OF THE INVENTION

1. Field of the Invention

The present invention relates to generator sets.

2. Description of the Related Art

The generator set (also referred to as "Genset") includes a generator, an internal combustion engine and a generator set control unit (also referred to as Genset controller), wherein the internal combustion engine has an engine control unit (also referred to as "ECU" electronic control unit—or engine control unit), wherein the engine is connected with the generator in a torque transmitting manner. To feed electrical power into a power grid, in particular an electrical supply grid, the generator should be synchronized with the grid. This applies in particular to a synchronous generator.

A method relates to the operation of the generator set ("Genset") with respect to a power grid which is operated at a grid voltage, wherein the generator set has a generator, an internal combustion engine and a generator set controller, wherein

- the internal combustion engine has an engine and an electronic/engine control unit ("ECU") and a combustion actuator which is connected to the ECU for control, which is controllable by way of a combustion control variable for torque-forming combustion adjustment of the engine, and
- the generator at a generator rotational speed is drive-connected to the engine at an engine rotational speed in order to generate a generator voltage at a generator voltage frequency in the generator, in particular for generating the generator voltage as a terminal voltage at the generator, wherein
- the grid voltage has assigned to it a grid frequency and a grid voltage phase, and the generator has assigned to it a generator voltage frequency and a generator voltage phase, wherein the method for a synchronized operation of the generator set with respect to the power grid provides synchronization of the generator voltage in regard to the grid voltage.

In modern energy supply systems, so-called balancing energy is becoming increasingly important for grid stabilization. Today's electrical supply grids make it necessary to take stabilization measures into account, among other things due to the increased use of renewable energy sources such as photovoltaics and wind energy and the associated causes of instability. To the extent that an energy supply causes fluctuations in the grid due to a high dynamic of renewable energy sources and could thus contribute to grid instabilities at least locally with higher dynamics, a so-called balancing energy that compensates for these fluctuations is therefore operated at comparative stability with an internal combustion engine with one engine, which is why a generator set is particularly suitable to provide this so-called balancing energy.

It is therefore important with a generator set to keep the time from the engine start of the combustion engine to load switching of the generator set as short as possible.

A starting operation of a generator set usually occurs in a rotational speed control mode, which is also intended for nominal operation. This already known type of starting operation in rotational speed control mode is generally composed of the following four stages, which are listed below with a simplified and non-restrictive concrete example:

- 1st stage: Start of the generator set with operation of the engine of the internal combustion engine at approximately one to two revolutions per second, in other words up to approx. 120 rpm for angular synchronization to the crankshaft within the first few seconds, in other words for the first adjustment of the generator rotational speed to the engine rotational speed, in this respect as the angular synchronization of the drive shaft of the generator to the crankshaft of the engine of the internal combustion engine;
- 2nd stage: Ramping up of the generator set for a duration of approximately 5 to 15 seconds, depending on the available charge air, possibly up to the range of the nominal speed of the engine;
- Stage 3: Synchronization of the generator set, that is the generator voltage of the generator, with the grid within a time of approximately up to 15 seconds;
- Stage 4: Implementation of load switching and subsequently operation of the generator set synchronously with the grid, namely also in speed control mode, in other words, regulating the speed of the internal combustion engine, in order to maintain synchronous operation.

In order to "synchronize the generator with the grid" when operating a generator set, the objective is to adapt the grid voltage and the generator voltage, specifically first the terminal voltage of the generator—optionally in their RMD values—as well as the frequency and phase position to the grid voltage and the generator voltage, or to achieve the same wave form of voltages for generator and grid in all phases of voltage. For this purpose, the generator sizes should be adapted to a generator voltage, the generator voltage frequency and the generator voltage phase; and the grid sizes should be adapted to a grid voltage, grid voltage frequency, and grid voltage phase. Initially, these should meet the synchronous conditions; only then can a power feed—for example the current from the electrical power into the power grid, in particular the electrical supply grid—occur appropriately, that is without interference or damage.

When starting a generator set, in particular in the optional case of a generator set with a synchronous generator, in relation to a power grid operating at a grid voltage, in order to "synchronize the generator with the grid", the aim is to synchronize the generator voltage with respect to the grid voltage.

The synchronous conditions basically require that the voltages of the synchronous machine in the embodiment of the synchronous generator and the grid must correspond. In particular, the voltages of the synchronous generator and the grid—with same phase sequence in the case of a voltage that is usually multi-phase, such as that of a three-phase system—must correspond to the three determinants of a sine wave value (a) according to the RMS value of voltages ($U_N$, $U_G$) of grid and generator and (b) frequency ($f_N$, $f_G$) and (c) phase position ($\Phi_N$, $\Phi_G$) of the voltages of grid and generator. This is especially true since—the two voltages coincide in frequency and value—it is usually the case that the two voltages differ only in the phase position. The generator voltage phase and the grid voltage phase are primarily to be understood relative to each other.

This phase shift has so far been eliminated by (once again) briefly intervening in the speed control elements of the engine, i.e. by operating the generator set with the internal combustion engine and synchronous generator in a "speed control mode" referred to herein. To illustrate this, the aforementioned operation of a generator set in the known speed control mode—as shown in example in FIG. 2A and FIG. 2B in connection with the basic structure of a generator set in FIG. 1A and FIG. 1B—is explained in the drawing. For further explanation of the background, it should be noted here that a fully automatic synchronization as described for example in https://de.wikipedia.org/wiki/Synchronoskop occurs usually by connecting the respective power supply units in parallel, in other words, by switching on an associated circuit breaker "in the so-called synchronous point" with a parallel switchgear that works in conjunction with a voltage and frequency tuning device.

The simplest way to observe compliance with the so-called synchronous conditions—just to provide one example—is a so-called synchronization column. The two voltmeters (for the voltage of the synchronous machine and the voltage of the grid) are combined in a double voltage meter, whereby the pointers of both measuring devices are assigned to a scale. Likewise, the two frequency meters are designed as dual frequency meters, in which the rows of oscillations are adjacent to each other in one housing. In order to observe the phase angle or the phase shift of the voltages, so-called phase lamps are used.

From this, the synchronization conditions—wherein the voltages of the synchronous machine and the network must correspond to the three determinants of a sine wave value in terms of RMS value, frequency and phase—can be read.

Measures that are required to generally meet synchronous conditions—in other words to synchronize a generator voltage with respect to the grid voltage—are called synchronization.

This occurs for example according to the following procedure within the scope of the fully automatic synchronization ("3rd stage"):

(i) The rotational field equality of the grids is realized before the first start-up of the installations.

(ii) After that, the frequencies of the two voltages are brought into conformity with each other. For this purpose, the speed of the synchronous machine must be changed. This is usually done by interfering with the speed control unit of the engine.

(iii) After the two voltages coincide in frequency and value, they can only differ in phase position.

This phase shift is eliminated by making another short-term intervention in the speed control elements of the engine. As a result, the frequency of the machine voltage—in this case that of the synchronous generator—changes during this time. This short-term frequency change must be terminated at phase equivalence, that is when there is no longer any voltage across the contacts of the circuit breaker.

If the synchronous conditions (i), (ii) and (iii) are met, the power switch can be switched on—the synchronous machine, in this case the synchronous generator, can be connected to the power grid for power transmission—without compensating currents starting to flow. In this case, this is referred to as fine synchronization.

For the implementation process, the generator is brought to a point where the wave form of the grid voltage exactly matches what the generator produces in terms of terminal voltage; this is described in detail, for example, in: https://crushtymks.com/energy-and-power/388-preparng-to-synchronize-a-generator-to-the-grid.html.

The parameters of a generator set terminal voltage, in particular frequency as well as the phase position of the generator voltage, are again specifically adjusted by the interaction of the generator set control (genset control) and the electronic control unit (ECU); whereby the electronic control unit usually controls that speed control element of the engine.

To put it simply: the step of reconciliation of the phase position to meet the synchronous condition ("(iii)" above) is carried out by activating a speed control of the combustion engine via its electronic control unit (ECU) as a consequence of a phase difference between the terminal voltage of the generator and the grid voltage determined in the generator set control; the speed control, in turn, implements a corresponding re-setting for the change in speed in a predetermined way.

If—again in the generator set control—a phase difference between the terminal voltage of the generator and the grid voltage is determined as being balanced, the speed control, which is predetermined in itself and independent of the generator set control, is stopped by the electronic control unit (ECU).

The problem with generator speed is that the generator set control (hereinafter also called Genset control) and the electronic control unit (ECU) sometimes follow different control premises or have different setpoint or pre-control specifications.

Consequently, waiting for the combustion engine to be brought to a "synchronous" operating point suitable for synchrony with the above-mentioned speed control system can sometimes last for a comparatively long time, or that an operating point of the engine of the internal combustion engine for which the generator set control establishes a synchronicity of the generator—that is, in particular until the phase angles of phase voltages, arranged respectively between each other (for example in the case of a three-phase voltage) of the generator and grid fall below a specified value—is a comparatively long time coming. Compared to the requirements for linking times of a generator to a power grid, speed control of the internal combustion engine works comparatively slowly.

The start-up operation of a generator set, in particular in an optional case of a generator set with a synchronous generator, in relation to a power grid operating at a grid voltage—in order to "synchronize the generator with the grid"—should therefore be improved with the aim of synchronizing the generator voltage with respect to the grid voltage. In this respect, an adaptation of the frequency and phase position according to the generator set control (on the one hand) and by a subsequent control of the set speed via a speed control of the internal combustion engine (on the other hand) is a reliable method of adaptation; not least this speed control is usually used in synchronous operation, as explained above.

However, in current generator set controls, the target speed of the engine is also readjusted by way of the generator set control to synchronize the generator set with the grid ("level 3," above) by way of the generator set control; that is, after ramping up of the generator set ("level 2," above), the speed control of the internal combustion engine is controlled by way of the generator set control system in order to synchronize the generator set with the grid; below, controlling the speed control of the internal combustion engine by way of the generator set control is referred to as the speed control mode.

This process can take up to 15 seconds or longer—thus, it is comparatively long—and thus wastes valuable time, which however is used for the classification of the generator set system, thereby reducing returns for the customer, and is therefore disadvantageous in terms of profits for the customer.

In one speed control mode, which remains active in particular after load switching ("level 4," above), this process can also last comparatively too long.

WO 2013/139862 A2 describes a method for synchronizing a generator that can be connected to a grid via a generator switch, which is accelerated by the following steps: (a) ramping up the generator speed from a value corresponding to a frequency below the grid frequency to a synchronization speed corresponding to the value of the grid frequency plus/minus a frequency difference for synchronization; b) waiting until the phase angle between phase voltages of the generator and the grid assigned to each other falls below a specified value; and c) connecting the generator to the grid by turning on the generator switch. This process can still be an improvement based on the aforementioned reasons.

What is needed in the art is a method and a device by way of which—in a method and device mentioned for operating a generator set or in a corresponding device of an internal combustion engine or a generator set—synchronization of the generator set with the power grid can be improved, in particular a synchronization time can be shortened. This relates in particular to a generator in the form of a synchronous generator.

SUMMARY OF THE INVENTION

The present invention provides a method for operating a generator set and a device for operating a generator set, and the invention relates to an internal combustion engine and a generator set.

The present invention is based on a method for operating a generator set, with respect to a power grid operated at a grid voltage, wherein the generator set has a generator, an internal combustion engine and a generator set control, wherein:

- the internal combustion engine has an engine and an electronic/engine control unit ("ECU") and has a combustion actuator control-connected to the electronic control unit, which can be controlled by way of a combustion control variable for the torque-forming combustion adjustment of the engine and
- the generator, at a generator speed, is connected to the engine at an engine speed for generating a generator voltage at a generator voltage frequency at the generator, in particular for generating the generator voltage as a terminal voltage at the generator, wherein
- a grid frequency and a grid voltage phase are assigned to the grid voltage, and wherein a generator voltage frequency and a generator voltage phase are assigned to the generator voltage, wherein the method for synchronizing the generator set with respect to the power grid, provides for synchronization of the generator voltage with respect to the grid voltage.

According to the present invention, the method for synchronizing the generator voltage with respect to the grid voltage provides that the generator voltage frequency and/or the generator voltage phase of the generator voltage generated by the generator is matched with respect to the grid frequency and/or the grid voltage phase.

According to the present invention, it is further provided that

- the generator set is operated in a synchronization mode to synchronize the generator voltage phase with the grid voltage phase, and the engine of the internal combustion engine is adjusted during operation, wherein
- the engine of the internal combustion engine is operated in a phase control mode with adjustment of an engine phase to change the generator voltage phase, wherein
- the grid voltage phase is transmitted to a phase regulator, and
- the phase regulator regulates the engine phase to a phase difference, which is created by a difference between the generator voltage phase and the grid voltage phase, wherein
- in order to adjust the engine phase depending on the phase difference, a phase parameter in the form of the combustion control variable is set for the torque-forming combustion setting of the engine.

The present invention has thus recognized that in a synchronization mode, especially advantageously in addition to a speed control mode, synchronization of the phase of the generator set with the power grid can be realized in an improved way by way of a phase regulator, in particular the synchronization time can be shortened by the improved phase regulator. This relates in particular to a generator in the embodiment of a synchronous generator.

In other words, in synchronization mode, it is provided that the engine of the internal combustion engine is operated in a phase control mode, by adapting an engine phase to change the generator voltage phase, in particular to control a generator set speed, in particular of the generator in the embodiment of a synchronous generator.

According to the present invention, the grid voltage phase is transmitted to a phase regulator which, according to the concept of the present invention, regulates the engine phase to a phase difference between the generator voltage phase and the grid voltage phase. In a manner of speaking, this makes it possible for the engine to be controlled directly to the phase difference. A grid voltage phase, in particular the phase difference of the type mentioned, is not yet available for regulating the engine.

By specifying the phase difference to a phase regulator, in particular directly to a phase regulator of the ECU, the concept of the present invention makes it possible that—for adaptation of the engine phase subject to the phase difference—a phase parameter in the form of the combustion control variable for the torque-forming combustion setting of the engine can be adjusted.

In this respect, the present invention is based on the idea that a conventional engine normally only adjusts the speed in speed mode until the generator voltage phase coincides with the grid voltage phase, without the grid voltage phase being explicitly specified for the control of the engine.

The present invention has now recognized that, in addition, an engine phase can be explicitly regulated to a phase difference of the generator voltage phase to the grid voltage phase in a phase regulator, wherein a phase parameter in the form of the combustion control variable is set to the torque-forming combustion setting of the engine to adjust the engine phase depending on the phase difference. This can significantly reduce the synchronization time.

This can for example be an injection parameter for the engine, in order to adjust the engine phase depending on the phase difference. In a further development, the combustion control variable for the torque-forming combustion setting of the engine is optionally selected from the group consisting of: fuel injection control variable, gas injection control variable, throttle valve control variable. The combustion control variable for the torque-forming combustion adjustment of the engine includes in particular a fuel allocation parameter for the engine, in particular an injection or injection parameter and/or a throttle parameter and/or ignition parameter.

The present invention moreover provides a device for operating a generator set ("Genset") with respect to a power grid operated at a grid voltage, wherein the generator set has a generator, an internal combustion engine and a generator set control, and the device includes:

- a generator sensor system for specifying a generator voltage frequency and a generator voltage phase of a generator voltage generated by the generator, in particular depending on a generator set speed during operation of the internal combustion engine,
- a grid sensor for specifying a grid voltage, to which a grid frequency and a grid voltage phase are assigned, and a generator voltage frequency ($f_G$) and a generator voltage phase are assigned to the generator voltage,
- a control and regulating device for synchronizing the generator voltage with respect to the grid voltage.

According to the present invention, it is provided that the control and regulating device is designed to carry out the process according to the concept of the present invention.

In an optional further development, the internal combustion engine has the control and regulating device which is designed to carry out the method as described herein, in particular wherein the control and regulating device is connected to or is part of an electronic control unit (ECU) of the internal combustion engine (BKM). Advantageously, at least the phase regulator can be designed as part of the electronic control unit (ECU), and the grid voltage phase can be transmitted to the electronic control unit in phase control mode, in particular only in synchronization mode.

In an optional further development, a speed control module can be provided for operating the generator set in a speed control mode, whereby the internal combustion engine is switched between the phase regulator and the speed control module, in particular in the event that the difference in the phase difference is not reduced when injecting with the injection parameter in the phase control mode for synchronizing the internal combustion engine, whereby the internal combustion engine is then switched from the synchronization mode to the speed control mode for synchronizing, in particular after a time-out time.

Furthermore, the present invention provides a generator set with the device according to the concept of the present invention.

Provision is made such that, with the inventive generator set:

- the internal combustion engine has an engine and an electronic or engine control unit ("ECU") and has a combustion actuator connected to the electronic control unit, which can be controlled by way of a combustion control variable for the torque-forming combustion adjustment of the engine, and
- that the generator at a generator speed is drive-connected with the engine at an engine speed, for generating a generator voltage at a generator voltage frequency on the generator, in particular for generating the generator voltage as a terminal voltage on the generator, whereby:
- a grid frequency and a grid voltage phase are assigned to the grid voltage, and a generator voltage frequency and a generator voltage phase are assigned to the generator voltage, wherein the generator set is designed to synchronize the generator set with respect to the power grid, to:
  - synchronize the generator voltage with respect to the grid voltage.

According to the present invention, it is provided that the generator voltage frequency and/or the generator voltage phase of the generator voltage generated by the generator is coordinated with respect to the grid frequency and/or the grid voltage phase, wherein:

- the generator set is operated in a synchronization mode to synchronize the generator voltage phase with the grid voltage phase, and the engine of the internal combustion engine is adjusted during operation, wherein
- the engine of the internal combustion engine is operated in a phase control mode with adjustment of an engine phase to change the generator voltage phase, wherein:
  - the grid voltage phase is transmitted to a phase regulator, and
  - the phase regulator regulates the engine phase to a phase difference, which is created by a difference between the generator voltage phase and the grid voltage phase, wherein
- to match the engine phase subject to the phase difference, a phase parameter in the form of the combustion control variable is set for the torque-forming combustion setting of the engine.

Advantageously, the engine is connected to the generator via a torque-transmitting drive shaft, whereby during operation of the internal combustion engine a rotor is rotationally driven relative to a stator of the generator to generate the generator voltage at the generator voltage frequency.

In an optional further development, the generator set is provided with a fuel supply device in the form of an injection, injection and/or throttling and/or ignition device for the combustion actuator connected to the engine control device, which can be controlled by way of a combustion control variable for torque-producing combustion adjustment of the engine. Optionally, the injection device can be designed to inject fuel or a gas injection device for a diesel or gasoline engine. The combustion actuator connected to the engine control device, which can be controlled by way of a combustion control variable for the torque-forming combustion setting of the engine, may also have a throttle valve for adjusting a gas flow mixture in a gas engine and/or a carburettor flap for adjusting a combustion mixture in a gasoline engine.

In the present case, the term "internal combustion engine" refers to an engine, optionally an internal combustion engine. In addition to the engine itself, an internal combustion engine has a whole variety of other components, such as the charge air and exhaust gas ducting, as well as exhaust gas treatment and turbocharging of the engine, and the injector or gas mixing system and control system should also be mentioned. However, an engine may be understood not only as a diesel engine, but also as a gasoline engine, in particular a gas engine, or a similar internal combustion engine as part of an internal combustion engine.

More generally, regardless of the type of engine, the engine may have a combustion actuator connected to the engine control device, which can be controlled by way of a combustion control variable for the torque-forming combustion setting of the engine. This includes, for example, a fuel allocation device, possibly including an ignition device, in particular with one or more of the torque-forming combustion actuators selected from the group consisting of: fuel injection actuator, gas injection actuator, throttle valve position actuator. A combustion actuator in this respect is part of a complex combustion actuator device, like an injector or injection device, for example, a common rail system with an injector or a gas mixer with a nozzle device. In particular, an injector or injection device may have an injector, injection and/or throttle element, optionally for the injection or injection of fuel such as diesel or gas in the case of a diesel or petrol, in particular a gas engine.

A combustion actuator may have the throttle element in the form of a throttle valve for adjusting a gas mixture flow rate in a gas engine and/or a carburetor flap for adjusting a combustion mixture in a gasoline engine; if necessary, this can also include an ignition device. A combustion actuator connected to the engine control device can be controlled by way of a combustion control variable for the torque-forming combustion setting of the engine.

The engine is optionally connected to the generator in a torque-transmitting manner via a drive shaft, whereby during operation of the internal combustion engine a rotor is rotationally driven relative to a stator of the generator to generate the generator voltage at the generator voltage frequency. In particular the generator connected to the engine of the internal combustion engine in a torque-transmitting manner, in particular in the form of a synchronous generator, is rigidly connected or connected by way of a gearbox.

In an optional further development, the present invention makes use of the fact that the engine phase is determined by way of an engine angle and/or a phase position of the crankshaft. In particular the engine phase can be provided as a time function of an engine angle (for example as an angle of rotation in the combustion cycle) and/or as phase position of the crankshaft (for example as a crankshaft rotation angle).

Moreover, in an advantageous further development, the generator voltage frequency and/or the generator voltage phase can be calculated from the engine speed and/or the engine phase

- taking into account a number of pole pairs of the generator, and/or
- taking into account a mechanical blocking angle between the internal combustion engine and the generator.

The concept of the present invention is therefore also based on the consideration that the input variables for determination of the phase position of engine and generator and also that of the grid are known in principle or are discoverable. Adapting a generator voltage phase that initially differs from the grid voltage phase in terms of the phase difference to the grid voltage phase basically means that the relative phase positions of the grid voltage (grid voltage phase) and the generator voltage are detected at practically the same voltage frequency and a phase difference describing the phase positions that is detected accordingly is minimized; in this respect, the generator voltage phase and the grid voltage phase are primarily to be understood in relative relation to each other.

An optional further development is based on the consideration that a characteristic of modern internal combustion engines can be used to shorten the synchronization time. Modern engine control systems know the phase position of the crankshaft at all times, as they have to control injection valves or spark plugs, among other things, at the correct angle. On the basis of this consideration, the further development has recognized that—if the generator is flanged to the engine at the correct angle or is attached via a transmission gear, so that the ratio is fixed or variable but can be calculated in any case—the engine phase is essentially known as the time function of the engine angle or phase position of the crankshaft (for example f(t)) and remains fixed at the generator voltage phase.

If the information of the grid voltage phase is now introduced into the electronic control unit, the electronic control unit is able to determine the difference between the two phases and to adjust it to a suitable, or possibly a required, minimum required.

Provision is optionally made so that in phase control mode, especially only in synchronization mode, the grid voltage phase is transmitted to the phase regulator. In particular, the phase regulator is designed as part of the electronic control unit, and the grid voltage phase is transmitted to the electronic control unit in phase control mode, especially only in synchronization mode. The phase regulator—for example a PLL (Phased Locked Loop) controller—is therefore optionally included in the electronic control unit. It compares the phase of the grid with the engine phase and adjusts the injection—especially by changing the engine phase—in such a way that the phase position—especially between the grid voltage phase and the generator voltage phase—is suitably adjusted, in particular minimized.

Within the scope of an optional further development it is provided that the specification of a generator voltage frequency and/or a generator voltage phase of a generator voltage is subject to a generator set speed during operation of the internal combustion engine. This improves the interaction of the generator-set control, and the electronic control unit contributes to the reduction of the synchronization time, as the engine and the generator can be transferred into phase-locked operation in an improved manner, especially when the generator voltage frequency and grid frequency are already approximately the same.

In particular, optionally in the electronic control unit, to which the generator voltage frequency and/or the generator voltage phase and correspondingly the grid frequency and/or the grid voltage phase are directly available, it can be provided that

- in speed control mode, the engine of the internal combustion engine is operated by adapting an engine speed to control a generator set speed. In particular, the engine speed can be changed in a predetermined manner, whereby the generator set speed is controlled.

In addition, or alternatively, it has proven to be advantageous that:

- in synchronization mode, the grid voltage phase is transmitted to the phase regulator in phase-control mode, whereby the engine of the internal combustion engine is operated by adjusting an engine phase to change the generator voltage phase.

It has proven to be advantageous that the engine is operated in the phase control mode by adapting an engine speed by changing the engine phase according to the phase difference, which results by comparing the generator voltage phase to the grid voltage phase; in particular the engine speed is regulated by changing the engine phase to minimize the phase difference, thereby controlling the generator set speed.

In general, it can be provided that the generator set can optionally be operated in a speed control mode as an alternative to the phase control mode in synchronization mode. In addition or alternatively, the generator set can advantageously be operated optionally in phase control mode in synchronization mode and subsequently in a speed control mode, in particular in the event that the difference between the generator voltage phase and the grid voltage phase is not reduced or is reduced only insignificantly in phase control mode, then the internal combustion engine is switched to speed control mode for synchronization, in particular after a time-out period.

In an optional further development, it is provided that the generator voltage frequency and/or the generator voltage phase for determining the phase difference is calculated from the engine phase and/or an engine speed of the engine of the internal combustion engine; this is optionally done in the electronic control unit, which has direct access to the generator voltage frequency and/or the generator voltage phase and, correspondingly, the grid frequency and/or the grid voltage phase. This reduces the control time to a generator voltage frequency and/or the generator voltage phase, which may first have to be measured at great expense; instead, the generator voltage frequency and/or the generator voltage phase can be calculated comparatively quickly and with less effort from the engine phase and/or the engine speed as part of a suitable physical transmission and generator model.

In an optional further development, it is provided that the generator connected to the engine of the internal combustion engine in a torque-transmitting manner, in particular in the form of a synchronous machine, is rigidly drive-connected via the shaft itself or by way of a flange; these variants can be taken into account in the aforementioned calculation, in particular by way of the physical displacement model (between the engine phase and generator phase on the drive shaft and crankshaft) and generator model. If it is possible to use a gear coupling to connect the drive shaft of the generator and the crankshaft of the engine on the drive side, it must be taken into account that a gearbox with a transmission ratio resolves a fixed phase reference; this can also be taken into account with a suitable transmission ratio model if required.

In an optional further development, it is provided that the generator voltage frequency and/or the generator voltage phase is calculated from the engine speed and/or the engine phase

- taking into account a number of pole pairs of the generator and/or
- taking into account a mechanical blocking angle between the internal combustion engine and the generator. In particular, it is provided that
  - for synchronization, the internal combustion engine is operated in a speed control mode, and, in the case of synchronized operation of the internal combustion engine from the speed control mode, a blocking angle is learned which indicates a difference between an engine rotation angle, in particular between a crankshaft angle of the engine and a rotor angle of the generator.

Thus, in the context of an optional further development, a phase parameter in the form of the combustion control variable for torque-forming combustion adjustment of the engine is set as part of the aforementioned control for adjusting the engine phase as a function of the phase difference, and this is optionally implemented for the engine in the engine control unit or the electronic control and regulating unit (ECU). Optionally, the generator voltage frequency and/or the generator voltage phase as well as the grid frequency and/or the grid voltage phase are directly available to the electronic engine control and regulating unit (ECU). By way of the aforementioned control

- a generator voltage frequency that initially differs from the grid frequency in a frequency difference is adapted to the grid frequency, and/or
- the generator voltage phase, which initially differs from the grid voltage phase in the phase difference, is adapted to the grid voltage phase.

In particular, it is provided that specifying a generator voltage frequency and/or a generator voltage phase of a generator voltage is subject to a generator set speed during operation of the internal combustion engine, and

- in synchronization mode, the engine of the internal combustion engine is operated in a phase control mode, adjusting an engine phase to change the generator voltage phase, and
- is operated in a variable speed mode to control a generator set speed.

The generator, in particular the synchronous generator, is optionally designed to produce a generator voltage as a terminal voltage at the generator, in other words, a generator voltage to which—as a terminal voltage—a generator voltage frequency and a generator voltage phase is assigned. In operation during the synchronization process, in particular in synchronization mode, the synchronous generator is not yet connected for outputting and/or feeding-in electrical power for the power grid; in other words, a load switch or main switch at the connection point of the generator is not yet closed; in this state, no power is generated in this respect.

However, the method is optionally designed so that the generator set already generates a generator voltage in such a way that it is prepared to supply and/or feed electrical power into the power grid, in particular to complete the synchronization operation of the generator set (genset) with respect to the power grid and/or subsequent operation.

In an optional further development it is provided that the phase difference for a phase-locked state between the generator voltage frequency and the grid frequency will be specified in the synchronization mode. The phase difference for a phase-locked state can be specified in particular at approximately equal generator voltage frequency and grid frequency. The phase can therefore be adjusted efficiently within the phase regulator, particularly if the phase difference is specified for a phase-locked state between the generator voltage frequency and the grid frequency, that is, when the engine speed is already close to a correct engine speed in this respect, which results in an only slightly different, particularly approximately equal, generator voltage frequency and grid frequency.

In an optional further development it is provided that, in the context of an aforementioned control, the frequency difference as a frequency adjustment value specifically indicates a difference between generator voltage frequency and grid frequency and/or the phase difference as a phase adjustment value indicates a difference between generator voltage phase and grid voltage phase for specifying the phase parameter in the form of the combustion control variable for torque-forming combustion adjustment of the engine in a frequency and/or phase control loop of the phase regulator. In particular, a phase signal which follows a strictly monotonic, in particular linear, transfer function of the phase difference between the generator voltage phase and the grid voltage phase, optionally a strictly monotonic, in particular linear, function of the phase difference of a phase angle between −180° and +180°, can advantageously be made available to the phase regulator at the input.

Optionally, as part of an optional further development, it can be provided that—in particular initially—the phase parameter in the form of the combustion control variable for torque-forming combustion adjustment of the engine in speed control mode is set subject to the frequency difference, in particular in the context of pilot control and/or pre-control, in such a way that the frequency difference is minimized during injection with the injection parameter.

In addition, or alternatively, it may be provided that—in particular subsequently—the phase parameter in the form of the combustion control variable for the torque-forming combustion setting of the engine is set to adjust the engine phase subject to the phase difference—in particular in the context of pilot control and/or pre-regulation—in such a way that the phase difference is minimized in the case of torque-forming combustion setting of the engine (for example injection or injecting or throttling) with the combustion control variable for the torque-forming combustion setting of the engine.

In the context of an optional further development, it is provided that in synchronization mode, the engine speed is first changed by ramping up from a starting speed of the engine until the generator voltage frequency and grid frequency coincide, and then the engine phase is adjusted accordingly in phase control mode to change the generator voltage phase. Advantageously, after ramping up, the generator set can then be operated in synchronization mode to synchronize the generator voltage phase with the grid voltage phase; in particular the engine phase can be adjusted accordingly in phase control mode to change the generator voltage phase.

As part of an optional further development, it is provided that in the speed control mode, in the event of synchronized operation of the combustion engine, a locking angle is learned, which indicates a difference between an engine rotation angle, in particular a crankshaft angle and a rotor angle of the generator, in particular where the combustion engine is operated at least once in a speed control mode for the purpose of synchronization.

Embodiments of the present invention are described below, with reference to the drawings, in comparison to the state of the art, which in part is also illustrated. The embodiments are not necessarily shown to scale but, where necessary for explanatory reasons, the drawings are presented in schematic and/or in slightly distorted images. It should be noted that a variety of modifications and changes can be made to the shape and detail of an embodiment without departing from the general idea of the present invention. The features of the present invention disclosed in the description, in the drawing and in the claims can be essential for the further development of the present invention both individually and in any combination. In addition, all combinations of at least two of the features disclosed in the description, the drawing and/or the claims fall within the scope of the present invention. The general idea of the present invention is not limited to the exact form or detail of the optional embodiment shown and described below, or limited to any subject matter that would be limited as compared to the subject matter claimed in the claims. In the case of specified design ranges, values of within the stated limits should also be disclosed as limit values and can be used and claimed as desired. Additional advantages, features and details of the present invention can be seen from the following description of the optional embodiments and from the drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

In the following, an embodiment of a basic structure of a generator set is explained with reference to FIG. 1A and FIG. 1B with respect to a start-up operation of FIG. 2A.

Figure 1A:
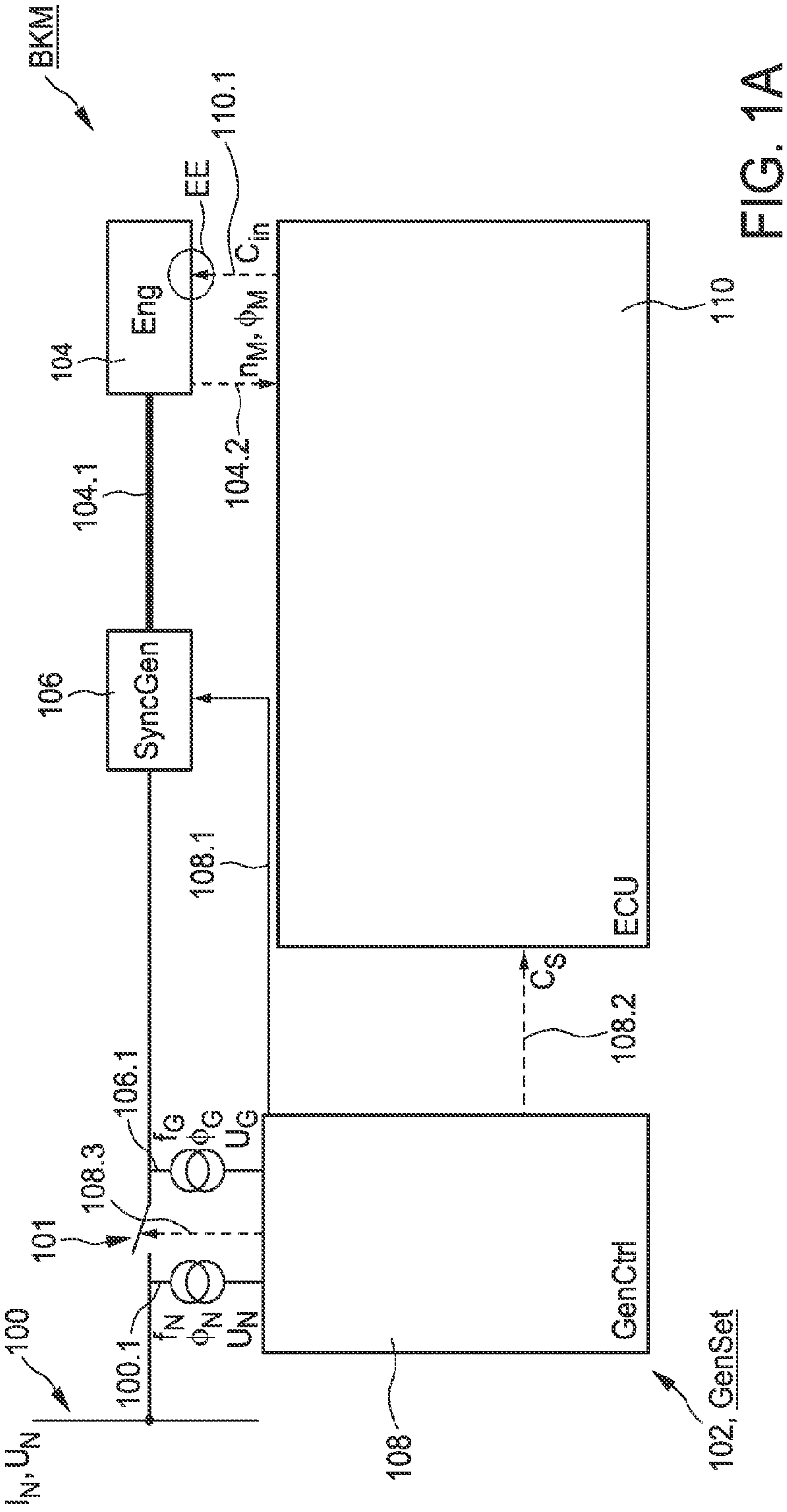
FIG. 1A is a basic schematic of a generator set provided for connection to an electrical power grid, in particular an electrical supply grid.

FIG. 1A shows a generator 106 in the embodiment of synchronous SynGen, as part of a generator set 102, intended for connection to a power grid 100. A generator set 102 of this type is usually referred to as Genset. In the following, reference is made also to Genset as the generator set 102. Generator set 102 in FIG. 1A is shown herein in its basic known configuration.

An electrical connection between the synchronous generator SyncGen and power grid 100 is established via a connection point 101 symbolically shown as a load switch. Generator 106 in the embodiment of the synchronous generator SyncGen is part of a complete generator set system, which herein is referred to as generator set GenSet and which also includes an internal combustion engine BKM. Internal combustion engine BKM has an engine 104 marked “Eng” and an electronic control unit referenced “ECU” 110.

Generator set GenSet 102 moreover includes a generator 106 which herein is designed as synchronous generator SyncGen and which is accordingly referenced as “SyncGen” and which has a generator set controller 108, identified as “GenCtrl”.

In the arrangement shown in FIG. 1A of generator set 102, generator 106 is thus designed as a synchronous machine in the embodiment of synchronous generator SyncGen. The SyncGen synchronous generator is connected to a drive train 104.1 of engine 104 at the correct angle. Before a SyncGen synchronous generator designed as a synchronous machine is connected to power grid 100, it must be synchronized with power grid 100 after asynchronous start-up. In generator mode, synchronous generator “SyncGen” 106 then generally runs at a relatively constant speed. A SyncGen synchronous generator of this type can deliver reactive power. As a result, the SyncGen synchronous generator can also be used as a synchronous machine for reactive power compensation and thus for grid stabilization of power grid 100. The reactive power behavior can be influenced via the excitation of SyncGen 106 synchronous generator.

For this purpose, generator set controller 108 receives a grid current assigned to the power grid via a connection provided with a voltage transformer; this can be a connection link 100.1 of connection point 101 for power/energy transmission—and therefore also using a connection transformer. Optionally, as in this example, a so-called voltage transformer, as a special form of a transformer, of a measurement connection can be used solely for measurement technology purposes (and less for power/energy transmission).

Generator set controller 108 is designed to determine relevant information about a grid frequency $f_N$, a grid voltage phase $\Phi_N$ and a grid voltage $U_N$ of the grid current of power grid 100 via connection link 100.1. Furthermore, generator set controller 108 receives a generator voltage assigned to generator 106 via a connection 106.1 provided with a voltage transformer. Generator set controller 108 is designed to receive information relevant to the generator voltage via connection 106.1 about a generator voltage frequency $f_G$ or generator speed $N_G$, a generator voltage phase—hereinafter referred to as generator voltage phase $P_D$— and a generator voltage $U_G$ of the generator current. Generator set controller 108 is designed to first establish an “equivalence” between grid current and generator current during a start-up of the combustion engine. The subsequent synchronization between the grid voltage and the generator voltage is implemented, inter alia, by an excitation 108.1 of generator 106; the corresponding variables—grid voltage $U_N$, generator voltage $U_G$ and grid frequency $f_N$, generator voltage frequency $f_G$ and grid voltage phase $P_N$, generator voltage phase $P_G$— are shown in FIG. 1A and FIG. 1B as $U_N$, $U_G$ or $f_N$, $\Phi_N$ and $f_G$, $\Phi_G$ respectively.

Synchronization of grid voltage phase PN with generator voltage phase $P_G$ as well as grid frequency $f_N$ with generator voltage frequency $f_G$ occurs by way of speed control, or, more precisely, a speed control with a more or less firmly specified procedure for changing the speed. For this purpose, a “speed control signal” or speed control signal 108.2 referenced “Cs” is transmitted from generator set control controller 108 to electronic control unit 110. Electronic control unit 110 receives speed control signal 108.2 and is designed to convert speed control signal 108.2 into—for example in the present case—an injection control signal 110.1 for the transmission of an injection parameter “$C_{In}$” and to transmit it to an injection device EE in order to use it to set a speed of engine 104. By way of engine signal 104.2, engine 104 reports to engine control device 110 an engine speed $n_M$ and an engine phase $\Phi_M$ affecting engine 104.

Generator set controller 108 is also designed to detect synchrony between grid voltage and generator voltage.

If there is synchrony in the sense of the synchrony conditions mentioned at the beginning, and in particular between the grid voltage phase $P_N$ and the generator voltage phase $P_G$ and the grid frequency $f_N$ and the generator voltage frequency $f_G$—in particular at the same speed—generator set controller 108 is also designed to establish an electrically conductive connection between power supply system 100 and generator 106 for feeding in electrical energy by way of a switch control signal 108.3 at connection point 101, in particular—as shown here—to close the circuit breaker.

Figure 1B:
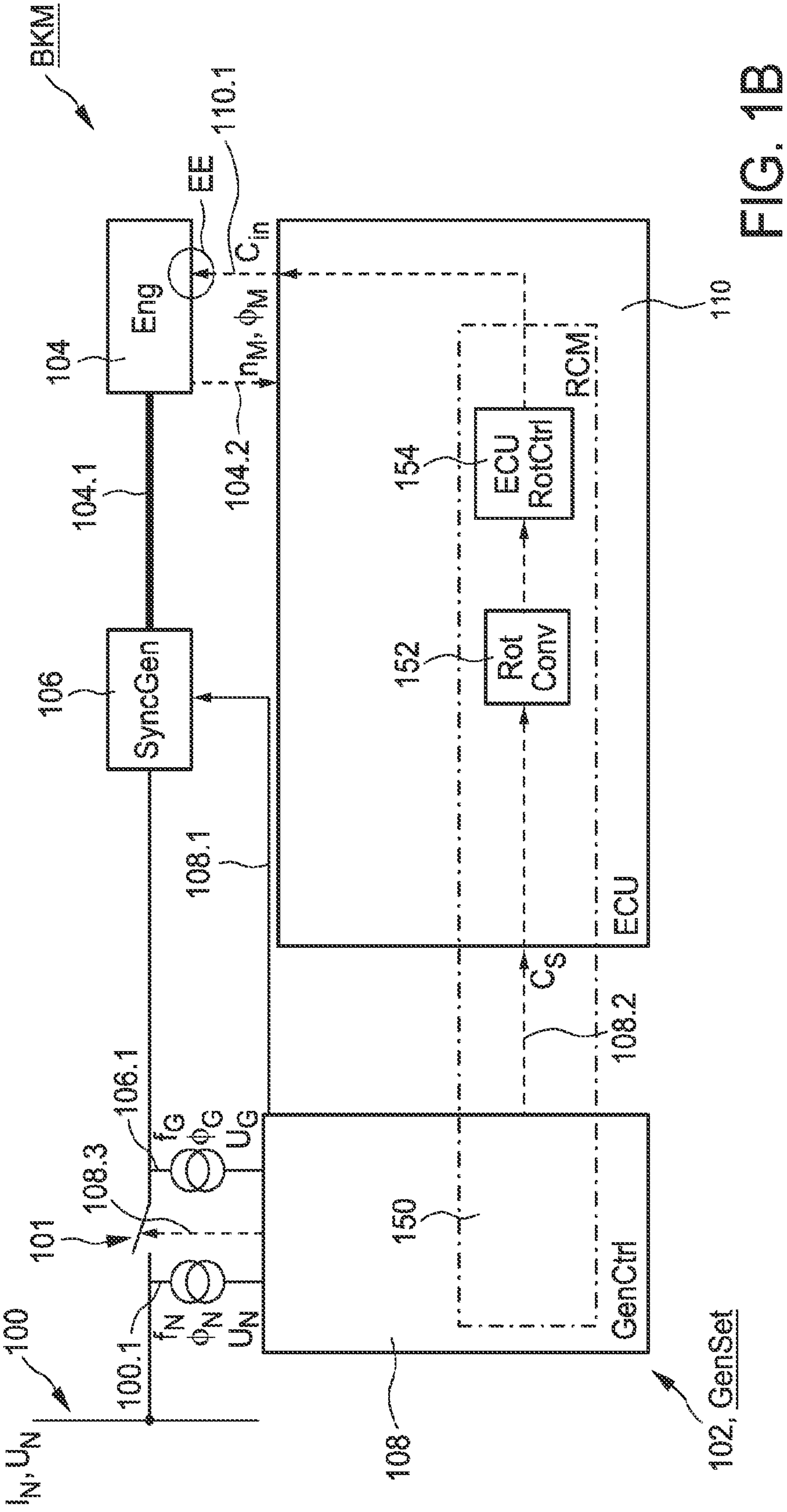
FIG. 1B shows additional details of a speed control mode of the generator set shown in FIG. 1A.

Based on FIG. 1A, FIG. 1B shows additional details of the speed control of generator set 102 illustrated in FIG. 1A, in other words of a basically known control of synchronous generator SyncGen for synchronization in a speed control mode under predetermined adjustment of injection parameter $C_{In}$ to an injection device EE of engine 104—that is, in the actual sense merely a control system. As already explained in FIG. 1A, the synchronization between generator current and grid current is first established in the design example shown; and then the synchronization between grid voltage phase $P_N$ with the generator voltage phase $P_G$ and the grid frequency $f_N$ with the generator voltage frequency $f_G$ is established with the aid of the speed control mode RCM of speed controller 150 shown in FIG. 1B.

During start-up operation of the generator set and by way of speed controller 150, generator set controller 108 issues a speed control command $C_S$ to electronic control unit 110. Speed control signal 108.2 is received by a rotational speed converter which is identified by "Rot Conv" and speed control command $C_s$ is converted into a speed specification and is made available. A speed controller 154 labelled "ECU RotCtrl" receives the speed specification and converts it into injection control signal $C_{In}$, which controls the engine speed of engine 104 via injection device EE. A time progression of the engine speed of engine 104 during start-up operation is explained below with reference to FIGS. 2A and 2B. FIG. 2A shows (illustrated with an arbitrary unit 204 on the Y-axis)—basic progressions 200 of engine speed 208 and engine power 206 of engine 104 as a function of time 202 during the start-up operation of a generator set 102; i.e., for connecting a generator 106 which is driven by the engine, namely a synchronous generator SyncGen, to grid 100; in particular, progression 200 concerns the start-up operation of generator set 102 shown in FIG. 1A and FIG. 1B with equivalence of currents and synchronization of voltages, as explained in reference to FIG. 1A and FIG. 1B.

The start-up operation—in addition to the explanation given at the beginning—can moreover be divided into four segments, namely: power-on segment, ramp-up segment, synchronization segment and load-switching segment.

Figure 2A:
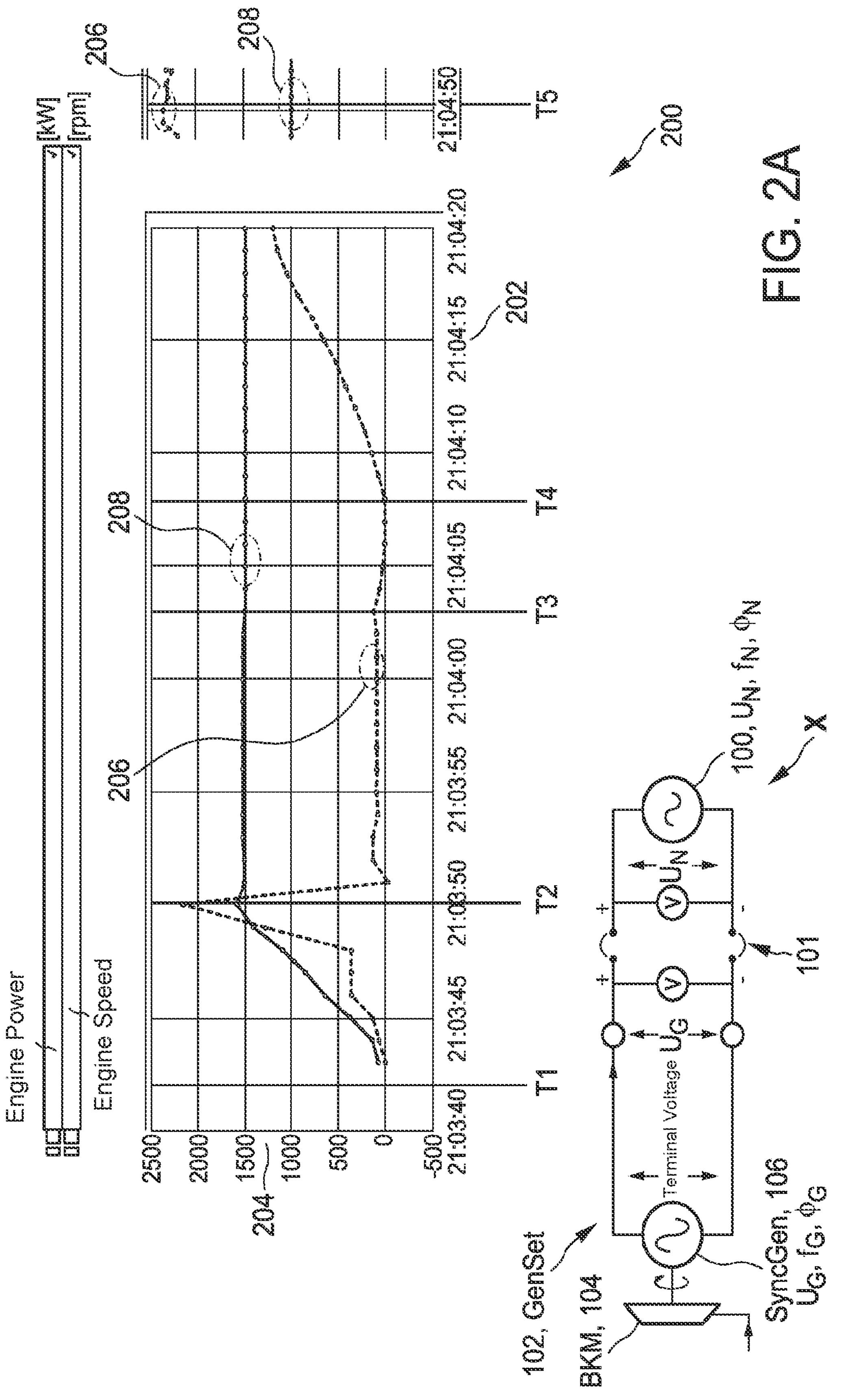
FIG. 2A shows progression of the engine speed and of an engine power of the engine of the generator set shown in FIG. 1A and FIG. 1B during the start-up operation of the generator set for connection to the power grid, herein namely an electrical supply grid according to the schematic shown in detail X.

In progression 200 shown in FIG. 2A, the power-on segment of engine 104 occurs at a point in time T1 (21:03:43) and lasts approximately 1 second. During this period, approximately 2 revolutions of a crankshaft of engine 104 are made for basic angular synchronization of the crankshaft of engine 104 at 120 rpm.

The starting segment of engine 104 is followed by the ramp-up segment. This results in a continuous increase in engine speed 208 and a corresponding increase in engine power 206. Ramping-up usually takes about 10-15 seconds and depends on the availability of charge air. In the example shown in FIG. 2A, the ramp-up segment continues until a point in time T2 (21:03:50). At the conclusion of the ramp-up segment, rotational engine speed 208 reaches an approximately constant value and engine power 206 is reduced to a value close to zero.

Following the ramp-up segment, a synchronization segment takes place. During the synchronization segment, the rotational speed of engine 104 of generator set 102 is adjusted by way of speed controller 150 already described in connection with FIG. 1A and FIG. 1B until the generator voltage produced by generator 106 is synchronous with the grid voltage of power grid 100. This process can take up to 15 seconds and ends at a point in time T3 (21:04:03) in the example shown in FIG. 2. During this synchronization segment, the actual synchronization of the synchronous generator to the power grid is implemented to achieve the synchronization conditions as explained at the beginning.

The load switching segment follows the ramp-up segment. In the present case, the load switching segment begins at time T3 (21:04:03). During the load switching segment, the engine power of engine 104 increases continuously. In the present case, the load switching segment ends with load switching at a point in time T5 (21:04:50).

Between a third point in time T3 and a fourth point in time T4, there is a segment in which a small proportion of recovery can be made before the above-mentioned load switching segment begins after the fourth point in time T4.

The procedure for operating a generator set ("genset") 102 with regard to a power grid operated at a grid voltage $U_N$, the generator set having a generator 106 in the embodiment of a synchronous generator SyncGen, an internal combustion engine BKM and a generator set controller 108, is basically designed in the manner explained above. On the basis of progression 200 of engine speed 208 shown in FIG. 2A, it becomes clear that the approach of providing only one speed control 150 needs to be improved.

During the synchronization segment, engine 104 of generator set 102 optionally already has an engine speed which corresponds approximately to the engine speed during the operation of generator set 102. However, due to a lack of synchrony between the generator voltage phase and the grid voltage phase, an energy feed cannot yet be used.

When using generator set 102 as an emergency power source in the event of a failure of a generator in power grid 100, it is essential to be able to feed the generator current into power grid 100 as quickly as possible.

Figure 2B:
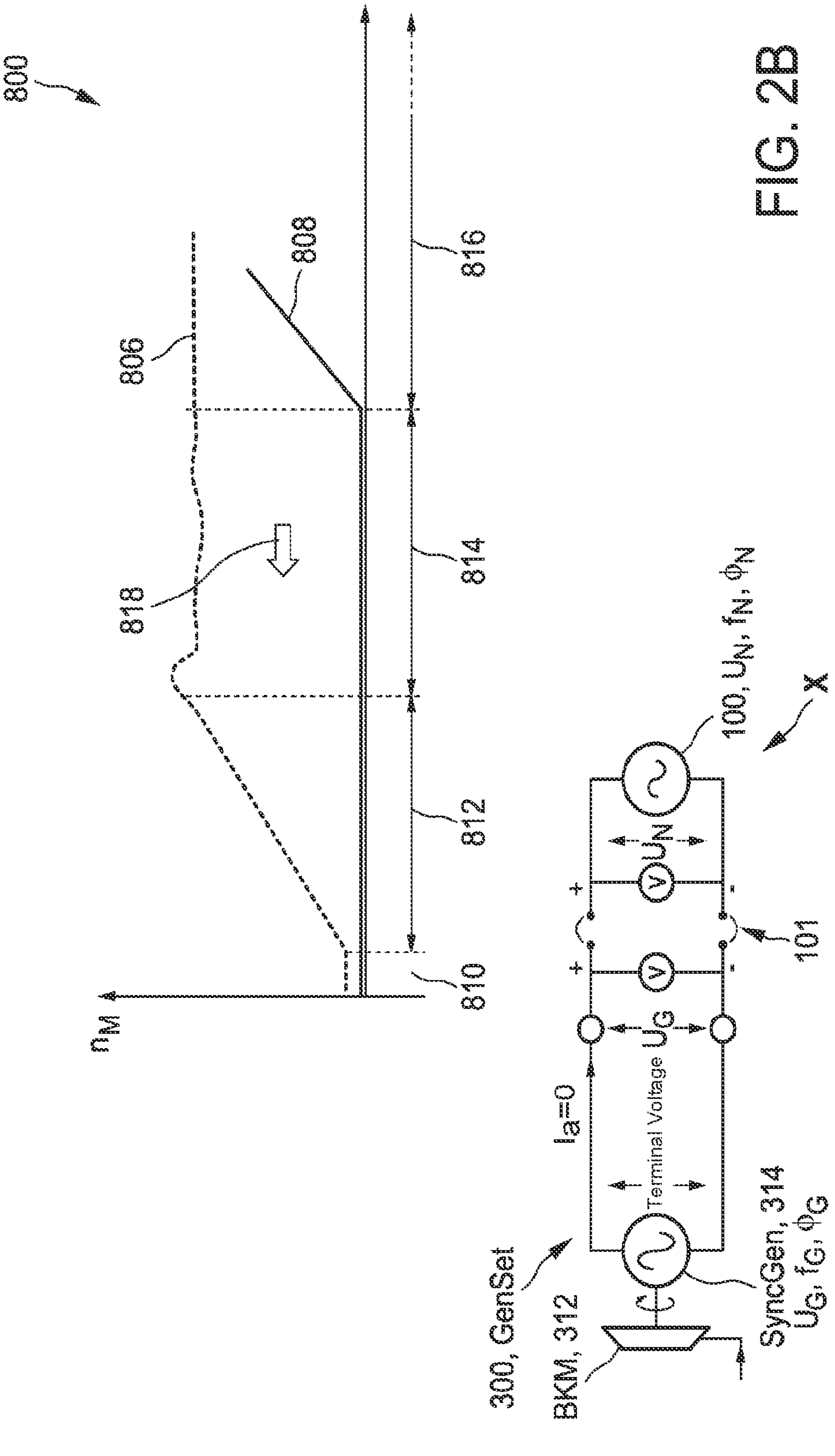
FIG. 2B is a schematic illustration of the effect of an improved synchronization of the generator set according to an optional embodiment of FIG. 3A and following, wherein the synchronization time can be shortened by synchronizing the improved generator set with the power grid, herein namely an electrical supply grid according to the schematic shown in detail X.

FIG. 2B shows progressions 800 of engine speed 806 and engine power 808 of engine 104 of a generator set 102 during a running-in operation of a generator set 102 for connection to a power grid 100, in the present case namely to an electrical power grid.

Progressions 800 shown are—as in the curves shown in FIG. 2A—engine speed 806 and engine power 808, respectively as a function of time during a running-in process of generator set 102. Also as in FIG. 2A, the four segments of the run-in process are shown: Start segment 810, ramp-up segment 812, synchronization segment 814, and load switching segment 816.

In this embodiment, generator set GenSet 300 according to the concept of the present invention includes internal combustion engine BKM with engine 312 and an electronic control unit ("ECU") and a combustion actuator connected to the electronic control unit for control purposes.

Combustion actuator VG, which is connected to the ECU control system and which can be controlled by way of a combustion control variable VS for the torque-forming combustion adjustment of the engine, may have a fuel allocation device in the form of an injection, and/or throttle and/or ignition device, optionally an injection device for fuel injection or a gas injection device in the case of a diesel or gasoline and/or a throttle valve for adjusting a mixture gas flow in a gas engine and/or a carburetor flap for adjusting an internal combustion mixture in a gasoline engine.

A combustion control variable VS for torque-generating combustion adjustment of the engine is selected from the group consisting of: fuel injection control variable, gas injection control variable, throttle position control variable. In particular, the combustion control variable for torque-generating combustion adjustment of the engine may include a fuel supply parameter for engine 312, in particular including an injection or injection parameter $C_{In}$ and/or a throttle parameter and/or an ignition parameter.

Combustion actuator VG connected to the electronic control unit can be controlled by way of a combustion control variable VS for torque-forming combustion adjustment of the engine.

Generator 314 is drive-connected at a generator speed NG to engine 312 at an engine speed for generating a generator voltage $U_G$ at a generator voltage frequency $f_G$ at the generator, in particular for generating generator voltage $U_G$ as a terminal voltage at the generator, wherein, a grid frequency $f_N$ and a grid voltage phase $P_N$ are assigned to grid voltage $U_N$, and a generator voltage frequency $f_G$ and a generator voltage phase $\Phi_G$ are assigned to the generator voltage $U_G$.

The method for synchronization operation of the Genset generator set with respect to power grid 100 provides for improved synchronization of generator voltage $U_G$ with respect to grid voltage $U_N$.

In the following, embodiments of the present invention are described with reference to FIG. 3A to FIG. 7. Therein it is generally provided that, according to the concept of the present invention, generator voltage frequency $f_G$ and/or generator voltage phase $\Phi_G$ of generator voltage $U_G$ generated by generator 314—namely a synchronous generator SyncGen—is coordinated with respect to grid frequency $f_N$ and/or grid voltage phase $P_N$.

It is therein provided that generator set 300 is operated in a synchronization mode for synchronizing generator voltage phase $\Phi_G$ with grid voltage phase $P_N$, and engine 312 of internal combustion engine BKM is adjusted in operation, wherein engine 312 of internal combustion engine BKM is operated in a phase control mode PCM by adaptation of an engine phase $\Phi_M$ to change generator voltage phase $\Phi_D$.

It is therein provided that grid voltage phase PN is transmitted to a phase regulator 704, and phase regulator 704 regulates engine phase $\Phi_M$ to a phase difference PD, which is formed from a difference between generator voltage phase $\Phi_G$ and grid voltage phase $\Phi_N$, wherein a phase parameter in the form of the combustion control variable VS is set to adjust engine phase PM as a function of the phase difference PD for torque-forming combustion adjustment of the engine.

Especially characterized in progression 800 is the effect of using the concept of the present invention in generator set GenSet 300.

Using a phase regulating according to the concept of the present invention during synchronization segment 814 may reduce the amount of time required for synchronization, which is illustrated by arrow 818. This allows load switching segment 816 to occur earlier, as synchronization segment 814 is considerably shortened. Thus, operating costs for operating generator set GenSet 300 can be reduced, and the power of generator set 300 can be made available to power grid 100 more quickly; in other words, generator set 300 can be connected to power grid 100 in a power-transmitting manner at an earlier point in time, corresponding to the shortened duration of synchronization segment 814; that is, circuit breaker 101 can be closed.

Figure 3A:
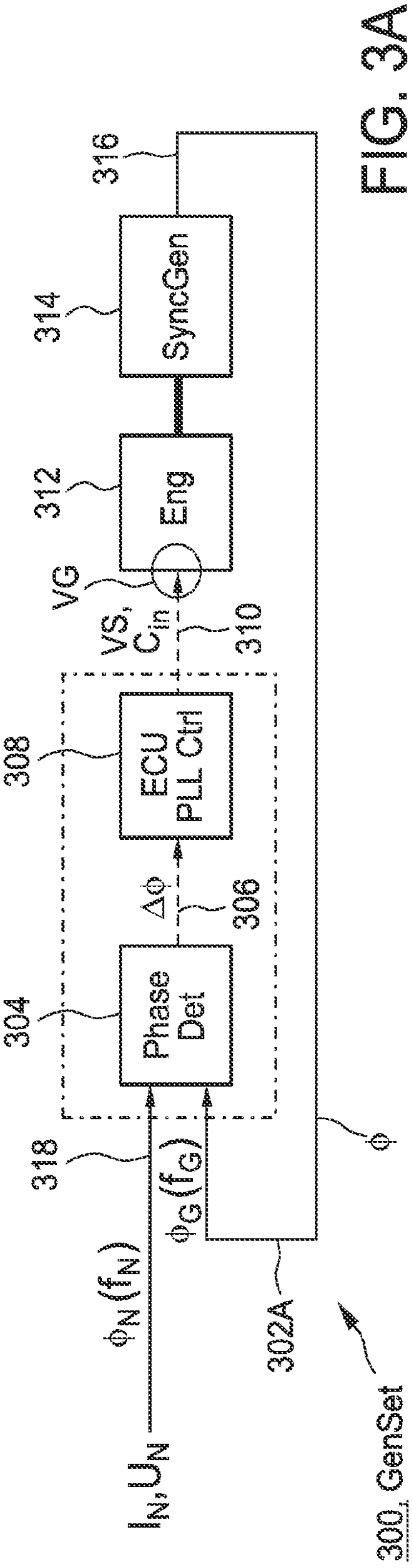
FIG. 3A is a first optional embodiment of a control loop for a device for operating an improved generator set while operating an internal combustion engine as part of a generator set, that is with a generator and an internal combustion engine according to the concept of the invention, wherein in this embodiment a phase control concerns a synchronization of the generator voltage phase $\Phi_G$ with the grid voltage phase $\Phi_N$, thus controlling the phase $\Phi$.

FIG. 3A shows an optional embodiment of a phase regulating device 302 for operating engine 312 of internal combustion engine BKM as part of generator set 300 with a generator 314 and internal combustion engine BKM including engine 312 according to the concept of the present invention. Phase regulating device 302 is designed to synchronize a generator voltage 316, $U_G$ generated by generator 314 with a grid voltage 318, $U_N$ of power grid 100 for feeding a generator current $I_a$ with generator voltage 316 into power grid 100 by way of a phase control.

As explained, a grid frequency $f_N$, a grid voltage $U_N$ and a grid voltage phase PN are assigned to power grid 100. Accordingly, generator 314 in the embodiment of synchronous generator SyncGen of generator set GenSet 300 has assigned to it a generator voltage frequency $f_G$ and/or a generator voltage phase $P_G$ of a generator voltage $U_G$ of the voltage generated by the generator, in particular, subject to a generator speed NG during operation of combustion engine BKM, or such can be determined.

Phase regulating device 302 has the function of a phase regulator 704, which is yet to be explained, and includes a comparison unit 304 designated "Phase-Det" and a pilot control unit 308 designated "ECU PLL-Ctrl".

Comparison unit 304 receives a generator voltage 316, $U_G$ and a grid voltage 318, $U_N$ and is designed, in particular, to determine a generator voltage phase $\Phi_G$ from generator voltage 316 and a grid voltage phase $\Phi_N$ from grid voltage 318 and to compare these with one another. Moreover, comparison unit 304 is designed to output an adjustment value 306, which indicates a difference between the generator voltage phase and the grid voltage phase. In the embodiment shown in FIG. 3A, adjustment value 306 is a phase difference between generator voltage phase $\Phi_G$ and grid voltage phase $\Phi_N$.

Pilot control unit 308 receives phase difference $\Delta\Phi$ and is designed to specify an injection parameter $C_{In}$—selected as an example in this embodiment—as a function of the phase difference $\Delta\Phi$. As explained above, a combustion control variable VS for torque-forming combustion adjustment of the engine can be selected from the group consisting of: fuel injection control variable, gas injection control variable, throttle position control variable; in particular, combustion control variable VS for the torque-forming combustion setting of the engine may include a fuel supply parameter for engine 312, in particular including an injection or injection parameter $C_{In}$ and/or a throttle parameter and/or ignition parameter.

Accordingly, in synchronization mode, engine 312 of the internal combustion engine is operated in a phase control mode PCM with adjustment of an engine phase PM to change the generator voltage phase PD, in particular to control a generator speed NG.

Figure 7:
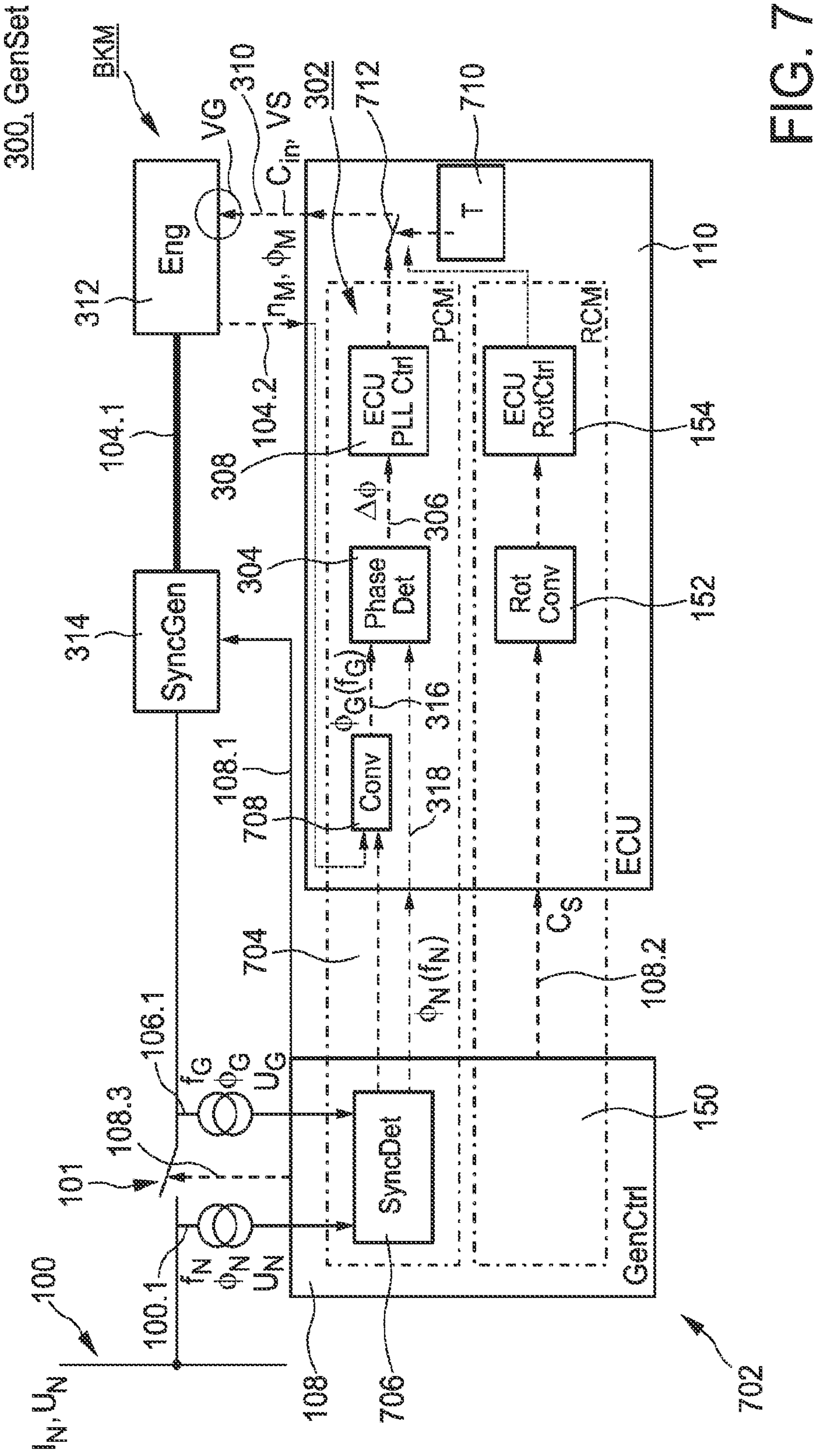
FIG. 7 is a basic diagram of an optional embodiment of a generator set intended for connection to a power grid with a phase control mode according to the concept of the invention.

Grid voltage phase PN is therein transmitted to above-referenced phase regulator 704, which is explained in more detail in FIG. 7, and phase regulator 704 regulates engine phase PM to a phase difference PD, $\Delta\Phi$ of generator voltage phase PG to grid voltage phase PN. Accordingly, an injection parameter $C_{In}$ for engine 312 is adjusted to adjust engine phase PM as a function of phase difference PD.

Engine 312 of the internal combustion engine recives injection parameter $C_Q$ and is designed—exemplary in this design example—to regulate the injection device by way of the injection parameter. As previously explained, a combustion actuator VG, which is connected to the engine control device and can be controlled by way of a combustion control variable for torque-forming combustion adjustment of the engine, can have a fuel supply device in the form of an injection-, injection- and/or throttle- and/or ignition-device, optionally an injection device for injecting fuel or a gas injection device in the case of a diesel or gasoline engine and/or a throttle valve for adjusting a gas flow mixture in the case of a gas engine and/or a carburetor flap for adjusting a combustion mixture in the case of a gasoline engine.

In particular, due to the angular coupling between internal combustion engine BKM and the generator, controlling the injection device by way of the injection parameter $C_{In}$ also has a comparatively easily determinable effect on generator 314 and thus on generator current 316 produced by generator 314. Injection parameter $C_{In}$ is selected by pilot control unit 308 in such a way that phase difference $\Delta\Phi$ between generator voltage phase $\Phi_G$ and grid voltage phase $\Phi$N is reduced for an injection device by injection parameter $C_{In}$.

In the embodiment shown in FIG. 3A, phase regulating device 302A, which has the function of a phase regulator

704, includes an ECU of engine 312 of the internal combustion engine. In other embodiments, pilot control unit 308 only includes the engine control device, wherein comparison unit 304 is located outside the engine control device, for example in a generator set controller of generator set 300.

In the previously described embodiment of FIG. 3A of phase regulating device 302A, reference was only made to the fact that phase regulating relates to synchronization of the generator voltage phase $\Phi_G$ with the grid voltage phase $\Phi_N$, thus regulating the phase Φ.

Figure 3B:
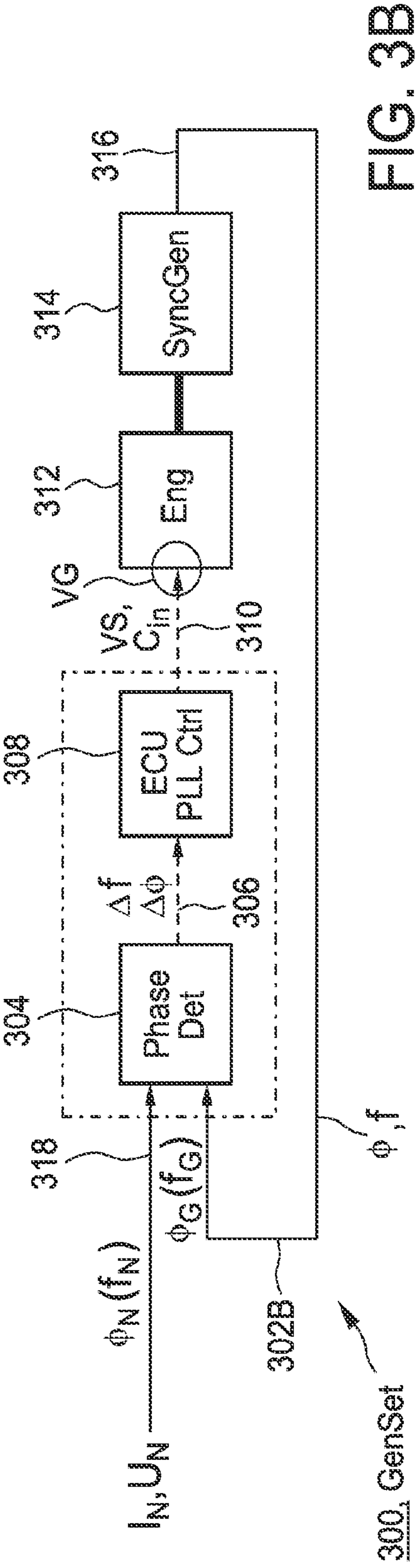
FIG. 3B is a second optional embodiment of a control loop for a device for operating an improved generator set while operating an internal combustion engine as part of a generator set, that is, with a generator and an internal combustion engine according to the concept of the invention, wherein in this embodiment a phase control concerns a synchronization of the generator voltage phase $\Phi_G$ with the grid voltage phase $\Phi_N$ and in addition to the phase difference PD, $\Delta\Phi$ also a frequency difference $\Delta f-$, thus phase $\Phi$ and frequency f regulates.

In an advanced embodiment shown in FIG. 3B, phase regulating device 302B is further developed to synchronize the generator voltage frequency $f_G$ with the grid frequency $f_N$. This means that the specification of a generator voltage frequency $f_G$ and a generator voltage phase $P_G$ of a generator voltage $U_G$ generated by generator 140 is subject to a generator speed NG during the operation of internal combustion engine BKM.

For this purpose, the engine of the internal combustion engine can initially be operated in speed control mode by adjusting engine speed to control a generator speed NG. Optionally thereafter, or based thereon—in synchronization mode—by way of phase regulating device 302 as per the design shown in FIG. 3A, FIG. 3B or FIG. 3C or the like—phase regulator 704 explained in more detail in FIG. 7 can have transmitted to it the grid voltage phase in phase control mode PCM, wherein the engine of the internal combustion engine is operated by adapting an engine phase PM to change the generator voltage phase PD.

In addition, a generator voltage frequency, which initially differs from the grid frequency in a frequency difference, is adjusted to the grid frequency, and the generator voltage phase, which initially differs from the grid voltage phase in phase difference, is—if necessary, based on this—adapted to the grid voltage phase.

In an expanded embodiment, the comparison unit thus additionally receives the generator voltage frequency $f_G$—which is shown in parenthesis in FIG. 3B—with the grid frequency $f_N$ and is designed to include in addition to phase difference PD, ΔΦ also a frequency difference Δf between the received frequencies into the determination of above-referenced adjustment value 306. Moreover, pilot control unit 308 is designed to take the frequency difference into account when specifying injection parameter $C_{In}$.

In another embodiment, shown here in FIG. 3B, comparison unit 304 is thus designed to calculate two adjustment values 306—in addition to phase difference PD, ΔΦ also a frequency difference Δf−, which respectively contain information regarding the difference between the received frequencies and the received phases.

Figure 3C:
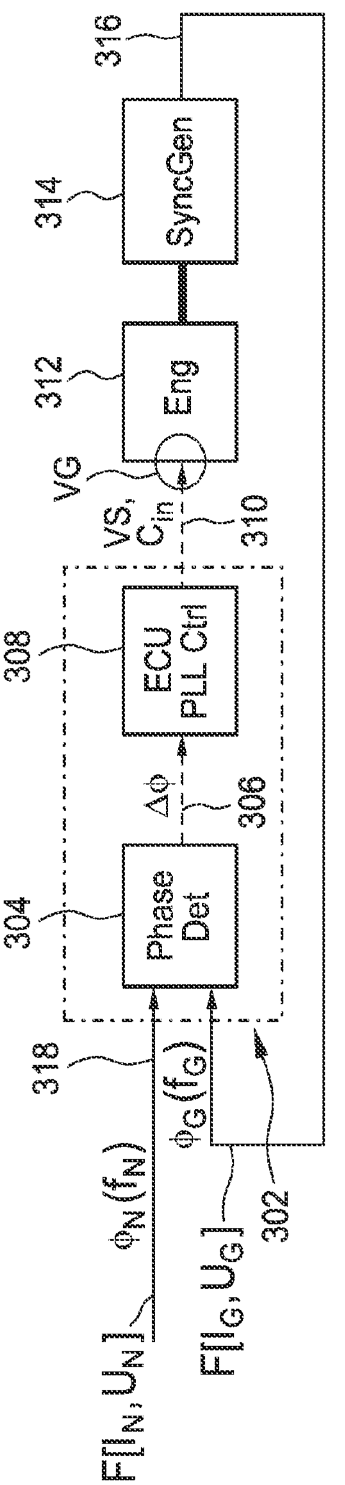
FIG. 3C is a third optional embodiment of a control loop for a device for operating an improved generator set operating an internal combustion engine as part of a generator set, that is, with a generator and an internal combustion engine according to the concept of the invention, wherein in this embodiment a phase control receives a transformed form $F[I_N, U_N]$, $F[I_G, U_G]$ of generator voltage 316 or of grid voltage 318.

It is not categorically required for comparison unit 304 to receive generator voltage 316 and grid voltage 318 directly. In another embodiment indicated herein by phases Φ in FIG. 3A, FIG. 3B and FIG. 3C, comparison unit 304 receives only two phase signals, or two phase signals and two frequency signals, which correspond to the generator voltage phase and grid voltage phase, or to the generator voltage frequency and the grid frequency. Accordingly, the phase difference of interest PD—possibly in addition to phase difference PD, ΔΦ also a frequency difference Δf—can be determined from such phase signals—possibly phase and/or frequency signals—to generator voltage 316 and to grid voltage 318.

In such an embodiment, shown in FIG. 3C, comparison unit 304 receives a transformed form $F[I_N, U_N]$, $F[I_G, U_G]$ of generator voltage 316 or grid voltage 318. Comparison unit 304 in this embodiment is also designed to determine the generator voltage phase and the grid voltage phase or the generator voltage phase, the generator voltage frequency, the grid voltage phase and the grid frequency on the basis of the transformed form of generator voltage 316 and grid voltage 318. Phase regulating device 302 can also be used to determine and regulate the phase difference of interest PD, ΔΦ and/or in addition to the phase difference PD, ΔΦ also a frequency difference Δf between the received frequencies.

In this respect, the design example shown in FIG. 3C with phase regulating device 302 with comparison unit 304 can be understood as a generalized form of phase control in order to transmit grid voltage phase PN to a phase regulator 704. Phase regulator 704 regulates herein the engine phase $P_M$ to a phase difference PD, which is formed from a difference between generator voltage phase $\Phi_G$ and grid voltage phase $\Phi_N$, and a phase parameter in the form of the combustion control variable is set for the torque-forming combustion setting of the engine to adjust engine phase $P_M$ subject to phase difference PD.

Transmission of the adjustment value for, in particular, the phase difference PD of interest from comparison unit 304 to pilot control unit 308 can be realized in various ways. An optional embodiment of a transmission signal for the adjustment value, which can primarily transmit phase information—and optionally both phase information and frequency information—is explained below with reference to FIG. 3D.

By way of phase regulating device 302 as shown in FIG. 3A, FIG. 3B or FIG. 3C or similar, the grid voltage phase is in any case transmitted to phase regulator 704 explained in more detail in FIG. 7, wherein the engine of the internal combustion engine is operated by adapting engine phase PM to change the generator voltage phase PD.

Figure 3D:
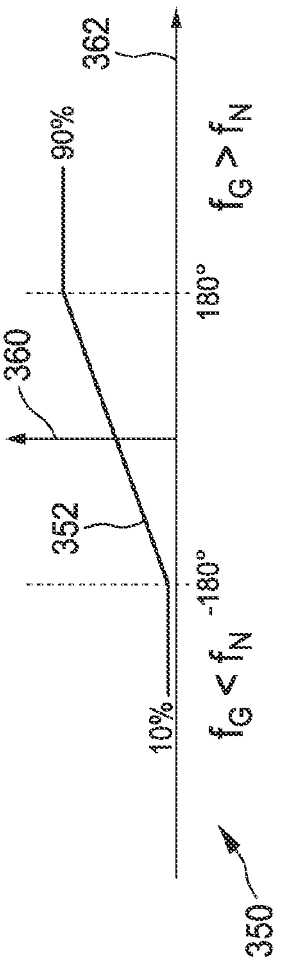
FIG. 3D is, for a device shown in FIG. 3A, FIG. 3B, FIG. 3C, a transfer function for a transfer of an adjustment value between the comparison unit and the pilot unit of the device shown in FIG. 3A, FIG. 3B, FIG. 3C for operating an improved generator set.

FIG. 3D shows one design example for a transfer signal for transfer of an adjustment value between comparison unit 304 and pilot control unit 308 of phase regulating device 302 shown in FIG. 3A, FIG. 3B and FIG. 3C. The transfer of the adjustment value is thereby based on a pulse width modulation. FIG. 3D shows in a middle range a functional correlation 352 between a pulse width 360 of the transmission signal and phase difference 362 for a range of −180° to +180°. In this middle range, the pulse width increases linearly from a value of 10% for a phase difference of −180° to a pulse width of 90% for a phase difference of 180° if the grid frequency and the generator voltage frequency are identical. The range outside −+180° is characterized in FIG. 3D by the fact that below −180° the speed is too low and above +180° the speed is too high.

In a thereupon based embodiment of comparison unit 304, the design calls for determination and transmission of a frequency difference between the generator voltage frequency and the grid frequency. For this purpose, functional dependency 352 is extended beyond the range of −180° to +180°.

In the embodiment shown here, a pulse width of 10% is used to form the transmission signal at a generator voltage frequency that is lower than the grid frequency ($f_G<f_N$), regardless of the phase difference.

If the generator voltage frequency is greater than the grid frequency ($f_G>f_N$), a pulse width of 90% is used to form the transmission signal, regardless of the phase difference.

This means that the basic structure of a PLL controller of FIG. 3D has a phase comparison element which—at a largely identical grid frequency and largely identical generator voltage frequency and a phase angle difference between −180 and +180 degrees—has an output that indicates the phase angle difference proportionally.

In the current example, the phase detector has a second function; namely, if the engine speed generator voltage frequency is less than the grid frequency, it will indicate −180°. If the generator frequency is greater than the grid frequency, it indicates +180°.

Figure 4:
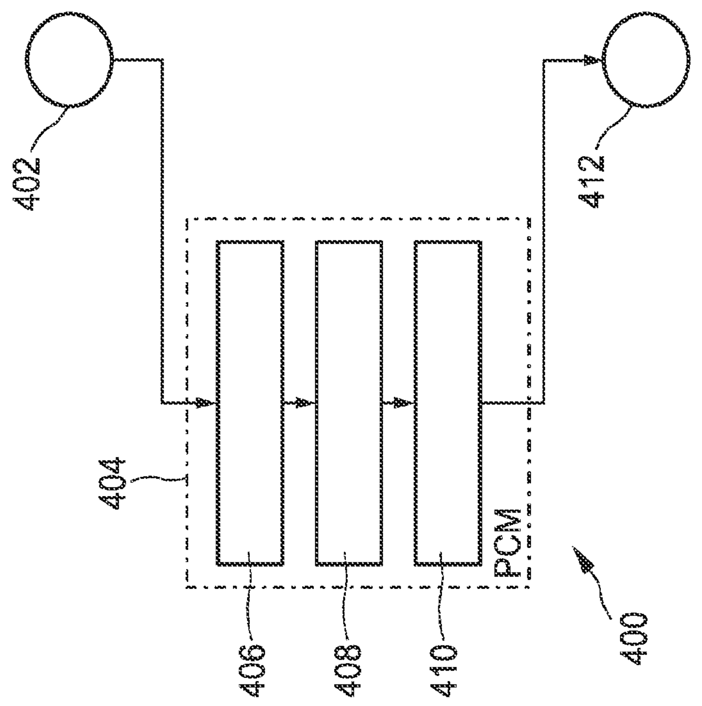
FIG. 4 is a flow chart of an optional embodiment of a method for operating an internal combustion engine of a generator set with a generator and the internal combustion engine, wherein the internal combustion engine has an engine with an injection device for injection of fuel.
Figure 5:
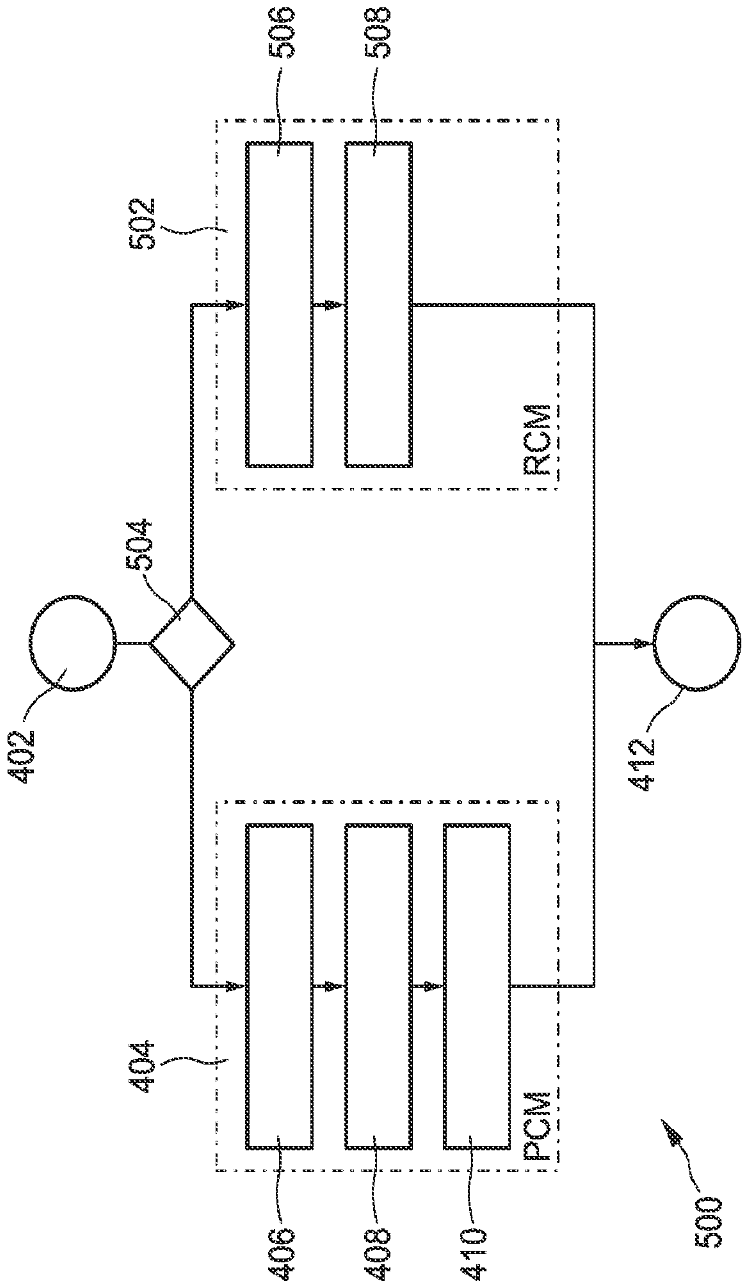
FIG. 5 is an additional embodiment of the method shown in FIG. 4, which has an additional speed control mode.
Figure 6:
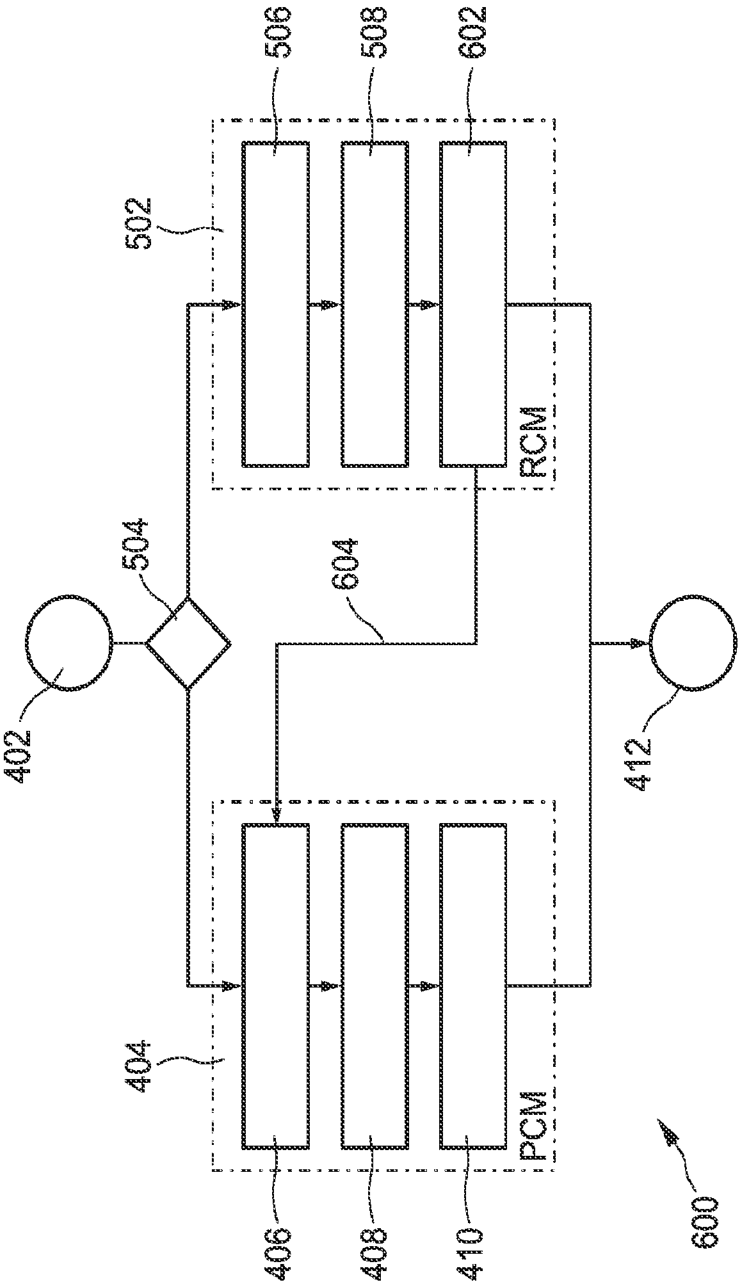
FIG. 6 is an additional embodiment of the method shown in FIG. 5, in which parameters relevant to the phase control mode are learned in the speed control mode.

In the following, basic flow charts of the embodiments of a method according to the concept of the present invention are shown in FIG. 4 to FIG. 6.

FIG. 4 shows a block diagram of a design example of a method 400 for operating an internal combustion engine of a generator set with a generator and the internal combustion engine, wherein the internal combustion engine has an engine with an injection device for fuel injection.

Method 400 serves to synchronize a generator voltage generated by the generator with a grid voltage of the power grid for power feed-in, wherein a generator voltage phase is adapted to the generator voltage, and a grid voltage phase is adapted to the grid voltage.

For synchronization, the internal combustion engine is operated in a phase control mode PCM referred to in FIG. 4 in step 404, wherein the synchronization is performed in three steps.

Starting at a starting point 402, the grid voltage phase and the generator voltage phase are determined in a first step 406. Then, in a step 408, the grid voltage phase is compared with the generator voltage phase, whereby an adjustment value is formed, which is designed to specify a difference, in particular a phase difference, between the generator voltage phase and the grid voltage phase. In a third step 410, an injection parameter $C_{In}$ is specified subject to the adjustment value, in such a way that the phase difference is reduced, in particular minimized, when fuel is injected with injection parameter $C_{In}$. Procedure 400 ends with a stop point 412.

Method 400 can be run once or several times to minimize the phase difference. Method 400 can also be applied continuously to ensure permanent synchrony between grid current and generator current during the operation of the internal combustion engine. Method 400 is expanded by additional steps in at least one modified embodiment. Some of these modified embodiments are explained below, referencing FIG. 5 to FIG. 6.

FIG. 5 shows a modified embodiment 500, in particular an expansion of the method shown in FIG. 4, which also has an optional speed control mode RCM in step 502. All steps already known from FIG. 4 of the method described in FIG. 4 have been adopted in FIG. 5 with the same reference sign. In the following, only the changes compared to the method shown in FIG. 4 are explained.

Speed control mode RCM in step 502 includes step 506 and step 508. In step 506, a speed specification is created for engine 312. In subsequent step 508, the speed specification is converted into an injection parameter $C_{In}$, in such a way that—during injection with the injection parameter $C_{In}$—the engine achieves the speed specification.

RCM speed control mode is basically also available as an alternative; that is, the combustion engine can basically already be operated in a speed control mode RCM for synchronization. However, phase control mode PCM is optional for synchronization. In principle, the internal combustion engine could also be operated in only a phase control mode PCM of step 404 designated in FIG. 4.

However, speed control mode RCM is optionally also additionally available; that is, within the framework of the optional embodiment, the internal combustion engine is initially operated in a phase-controlled mode PCM in step 404 shown in FIG. 4, and only after the phase-control mode PCM explained above is the internal combustion engine operated in a speed control mode RCM. In particular, this occurs in an available variant of the embodiment of the method 500 if synchronization has been achieved by way of the phase control mode PCM—or, in particular after a time-out period, has not been achieved. The internal combustion engine is then operated in the speed control mode RCM after the phase control mode PCM.

In an equally available variation of the embodiment of method 500, it is optional to switch from the phase control mode PCM of step 404 to the speed control mode RCM of step 502 whenever the synchronization of the generator voltage with the grid voltage is not successful within a predefined time interval, in particular a time-out time.

It is possible to switch between RCM speed control mode and phase control mode PCM by way of branching element 504. Switching between phase control mode PCM of step 404 and speed control mode RCM of step 502 is particularly advantageous in cases where the generator voltage frequency or generator voltage phase is not directly detected by a phase regulating device carrying out method 500. This is the case, for example, when the phase regulating device is part of the engine control device. In these instances, the generator voltage phase and the generator voltage frequency can be determined from engine speed and engine phase, which are often provided to the engine control system of modern engines by the engines themselves. However, to be able to draw conclusions about the generator voltage phase and the generator voltage frequency from the engine speed and the engine phase, various determining parameters should be available, which are best determined beforehand in the RCM speed control mode.

A modified version of method 500, which determines the determination parameters in the RCM speed control mode, is explained below on the basis of FIG. 6.

FIG. 6 shows an additional embodiment 600, in particular in expansion of method 500 shown in FIG. 5, in which relevant parameters are learned in the speed control mode RCM in step 502 for phase control mode PCM in step 404. Embodiment 600 of the method is particularly advantageous when the determination of the generator voltage phase is based on the engine phase and/or the generator voltage frequency is determined on the basis of the engine frequency and the determination parameters required for the determination are not initially known. In this case, method 600 can be used to determine the determination parameters in a first phase of the method.

To determine the generator voltage phase from the engine phase, it is useful to determine the angular difference (hereinafter also referred to as blocking angle) between a crankshaft phase position of an engine crankshaft and a rotor phase position of a rotor of the generator. In principle, a blocking angle and a number of pole pairs can also be set regardless of whether there is synchrony between the grid voltage phase and the generator voltage phase. The aforementioned angle difference can be determined in particular by the angle at which the generator is flange-mounted to the engine drive train; this information can be made available to the generator set control unit and the electronic control unit, in particular as part of a GenSet-individualized initialization.

If the generator voltage frequency is also to be determined from the engine frequency, information about a number of pole pairs of the generator should also be available. This information can also be made available to the generator set controller and the engine control device, especially in the context of GenSet-individualized initialization.

If at least one of the determination parameters is unknown, the synchronization between the generator voltage and the grid voltage is first carried out in speed control mode RCM in step 502 in method 600 shown in FIG. 6.

Once synchrony has been established, the generator voltage phase and/or generator voltage frequency of the generator set controller are known.

By comparing the generator voltage phase with the engine phase and/or the generator voltage frequency with the engine frequency, the blocking angle and/or the number of pole pairs can be determined.

A connection 604 between step 602 and step 406 symbolizes that the determined parameters are recorded and can be used to determine the generator voltage phase and/or generator voltage frequency if the procedure is subsequently performed in phase control mode PCM.

Subsequently, the process is changed from the RCM speed control mode to the PCM phase-control mode. If the determining parameters change, for example due to a replacement of the generator, the process is initially operated again in the speed control mode RCM to determine the determination parameters.

In the following, an optional embodiment of a GenSet 300 generator set is explained by way of FIG. 7 having a phase regulating device 302 for carrying out method 600 of FIG. 6, that is, with a phase regulating device with which the properties of the concept of the present invention described in the description of FIG. 2B to FIG. 6 can be realized.

Within the framework of an optional embodiment, FIG. 7 shows a device for operating a generator set, including a generator 314 in the embodiment of a synchronous generator SyncGen, an internal combustion engine BKM with an enginge 312 identified as "Eng" and a generator set controller 108 with a phase regulating device 302 and a speed controller 150, wherein internal combustion engine BKM in addition to engine 312 also includes an electronic control unit 110, ECU. Engine 312 is connected with synchonous generator SyncGen in a torque transferring manner; this serves initially to produce a generator voltage $U_G$ at a generator voltage frequency $f_G$ at the generator, in particular to produce the generator voltage $U_G$ as a terminal voltage at the generator. The generator set produces the generator voltage $U_G$ in such a way that it is prepared to supply and/or feed an electrical power P to power grid 100, in particular for the conclusion of a synchronization operation of generator set GenSet with respect to power grid 100 and/or a subsequent operation.

Power grid 100 has assigned to it a grid voltage $U_N$ with a grid frequency $f_N$ and a grid voltage phase PN. Engine 312 has an injection device for injecting fuel. In general, a combustion control variable VS for the torque-forming combustion adjustment of the engine can be selected from the group consisting of: fuel injection control variable, gas injection control variable, throttle valve position control variable; in particular combustion control variable VS for the torque-forming combustion adjustment of the engine may include a fuel allocation parameter for engine 312, in particular an injection or injection parameter $C_{In}$ and/or a throttle parameter and/or an ignition parameter.

Accordingly, it is provided that combustion actuator VG connected to electronic control unit ECU, which can be controlled by way of a combustion control variable VS for torque-forming combustion adjustment of the engine, shall have a fuel distribution device in the form of an injection, injection and/or throttle and/or ignition device, optionally an injection device for injecting fuel or a gas injection device in the case of a diesel or gasoline engine and/or has a throttle valve for adjusting a gas flow mixture in a gas engine and/or a carburetor flap for adjusting a combustion mixture in a gasoline engine.

The device for operating the generator set (Genset) with respect to a power grid 100 operated at a grid voltage $U_N$ includes:

- a generator sensor system for specifying a generator voltage frequency $f_G$ and a generator voltage phase $P_G$ of a generator voltage $U_G$ generated by generator 314, in particular depending on a generator set speed NG during operation of the internal combustion engine,
- a grid sensor system for specifying a grid voltage $U_N$, to which a grid frequency $f_N$ and a grid voltage phase PN are assigned, and wherein a generator voltage frequency ($f_G$) and a generator voltage phase $\Phi D_G$ are assigned to the generator voltage $U_G$, and in addition
- a control and regulating device for synchronizing generator voltage $U_G$ with respect to grid voltage $U_N$, which is designed according to the concept of the present invention.

For this purpose, the control and regulating device is equipped with phase regulating device 302 and is designed to carry out the process according to the concept of the present invention. In particular, the control and regulating device, or at least phase regulating device 302, may be connected to or be part of an electronic control unit (ECU) of the internal combustion engine BKM.

GenSet generator set, 300 in its entirety is designed with the device, in particular including phase regulating device 302; and internal combustion engine BKM is designed with a control and regulating device, in particular including the phase regulating device 302, to carry out the process according to the concept of the present invention, in particular wherein the control and regulating device is connected to or is part of an electronic control unit ECU of internal combustion engine BKM.

As explained above, internal combustion engine BKM is equipped with engine 312 and an electronic control unit ("ECU") and a combustion actuator connected to the engine control device, which can be controlled by way of a combustion control variable for the torque-forming combustion adjustment of the engine. The combustion actuator connected to the electronic control unit, which can be controlled by way of a combustion control variable for torque-forming combustion adjustment of the engine, may have a fuel allocation device in the form of an injection, injection and/or throttle and/or ignition device. This is optionally an injection device for fuel injection or a gas injection device in the case of a diesel or gasoline engine and/or a throttle valve for adjusting a gas mixture flow in a gas engine and/or a carburetor flap for adjusting a combustion mixture in a gasoline engine.

At a generator speed NG, generator 314 is drive-connected to engine 312 at an engine speed, for generating a generator voltage $U_G$ at a generator voltage frequency $f_G$ at the generator, in particular for generating the generator voltage $U_G$ as a terminal voltage at the generator, as explained earlier.

A grid frequency $f_N$ and a grid voltage phase PN are assigned to grid voltage $U_N$, and a generator voltage frequency $f_G$ and a generator voltage phase $\Phi_G$ are assigned to generator voltage $U_G$, wherein generator set GenSet 300 is designed for synchronization operation of generator set 102, GenSet with respect to power grid 100, to synchronize generator voltage $U_G$ with respect to grid voltage $U_N$.

According to the concept of the present invention, in the design example of generator set 300, GenSet in the embodiment shown in FIG. 7, it is now also provided that generator voltage frequency $f_G$ and/or generator voltage phase $\Phi_G$ of generator voltage $U_G$ generated by generator 140 is adapted with respect to grid frequency $f_N$ and/or grid voltage phase $P_N$.

For this purpose, generator set 300, GenSet can be operated in a synchronization mode for synchronizing generator voltage phase $\Phi_G$ with grid voltage phase $P_N$, wherein engine 312 of internal combustion engine BKM is adjusted during operation.

For this purpose, engine 312 of internal combustion engine BKM can be operated in phase control mode PCM by adapting an engine phase 4 to change generator voltage phase $\Phi_D$.

As explained above with regard to FIG. 3A, FIG. 3B, FIG. 3C and FIG. 3D, following the concept of the present invention, the grid voltage phase $P_N$ is transmitted to a phase regulator 704, and phase regulator 704 regulates engine phase $\Phi_M$ to a phase difference $P_D$ by way of phase regulator device 302. This phase difference $P_D$ is formed from a difference between the generator voltage phase $\Phi_G$ and the grid voltage phase ON, wherein a phase parameter in the form of the combustion control variable is set for the torque-forming combustion setting of the engine to adjust engine phase $P_M$ depending on phase difference $P_D$.

Based on FIG. 3A to FIG. 3B, FIG. 7 shows a generator set 702 provided for connection to a power grid 100 designed to perform a phase control mode PCM. Some components of generator set 702 have already been explained previously with reference to FIG. 1A and FIG. 1B. Thus it is shown here again that engine Eng 312 is connected to generator 314 in the embodiment of synchronous generator SyncGen via a drive shaft in a torque-transmitting manner, whereby during operation of the internal combustion engine a rotor is rotationally driven relative to a stator of the generator to generate generator voltage $U_G$ at generator voltage frequency $f_G$. In particular, generator 106, which is connected to the engine of the internal combustion engine in a torque-transmitting manner and—in the current example—is in the embodiment of a synchronous generator, is connected rigidly or by way of a gearbox.

Generator set 702, or respectively GenSet 300, is thus designed to perform a phase control PCM in phase regulator 704, which is designed to determine the injection control signal $C_{In}$ based on a phase difference between generator voltage phase $\Phi_G$ and grid voltage phase $\Phi_N$. For this purpose, phase control PCM includes phase regulator 704, a synchronization detector 706 designated "SyncDet", a converter unit 708 designated "Conv" as well as comparison unit 304 and pilot control unit 308, already described in connection with FIG. 3A.

As in FIG. 3A, comparison unit 304 receives generator voltage phase $\Phi_G$ and grid voltage phase $\Phi_N$ and is designed to calculate the phase difference $\Delta\Phi$ between the two phases. In contrast to the device shown in FIG. 3A, generator voltage phase $\Phi_G$ is not derived directly from the generator voltage, but is determined from the engine phase $\Phi_M$. For this purpose, converter unit 708 receives engine phase $\Phi_M$ and is designed to determine the generator voltage phase $\Phi_G$ based on the engine phase $\Phi_M$ and the blocking angle. Comparison unit 304 receives grid voltage phase $\Phi_N$ from synchronization detector 706, which is designed to determine it from the grid voltage.

When converting engine angular velocity and grid angular velocity, the number of pole pairs of the generator is advantageously considered. If the electronic control unit does not know the mechanical blocking angle, it can be learned. This is done by a so-called synchrony detector, which outputs a relevant signal value as soon as it determines the synchrony between the generator voltage phase and the grid voltage phase. If, at the same time, the engine torque is still close to the friction torque, the "blocking angle" is stored; this enables output of generator frequency and generator phase, and the PLL controller can work.

Moreover, generator set 702 or respectively GenSet 300 includes a timer 710 identified with "Timer" T, which is designed to actuate a switch 712 after a predefined period of time during which the generator voltage could not be synchronized with the grid voltage, which switches from a phase regulator 704 to a speed controller 150. If the synchronization does not take place by at least after a timeout time T, the structure is switched to normal speed controller for a "teach-in", and thus a synchronization is carried out by way of the aforementioned "Speed Up/Speed Down" via the speed specification.

The synchronization between generator voltage $U_G$ and grid voltage $U_N$ is then carried out by way of the speed control already described in FIG. 1A and FIG. 1B.

If the system is then synchronous, a synchronous condition is reported, and it is possible to remember the new blocking angle (relation of generator and engine angle or phase). The next time the system starts, it will be able to perform a quick synchronization via the PLL phase controller. After a synchronization is established, the synchronizer detector 706 sends a signal to the converter unit 708 to learn the blocking angle.

In another embodiment indicated in FIG. 7, comparison unit 304 receives, in addition to the generator voltage phase and the grid voltage phase, grid frequency $f_N$ and generator voltage frequency $f_G$ in parenthesis and is designed to determine a frequency difference in addition to the phase difference. In this respect, this corresponds to the embodiment as explained in FIG. 3B. In the embodiment shown here, the phase difference and the frequency difference in a transmission signal—as described in FIG. 3D—are subsequently transmitted to pilot control unit 308. Pilot control unit 308 is designed to determine injection parameter $C_{In}$ referred to herein, following receipt of the transmission signal—as an example for a phase parameter in the form of the combustion control variable for torque-forming combustion adjustment of the engine—on the basis of the phase difference and the frequency difference.

To also be able to transmit the generator voltage frequency $f_G$ to comparison unit 304 in the embodiment shown in FIG. 7, this is calculated beforehand by converter unit 708 from engine speed $n_M$ based on a previously determined pole pair number of the generator. The grid voltage phase can be detected via an analog channel. The grid voltage phase can also be detected via a binary input. The binary input receives a high level for a positive half-wave and a low level for a negative half-wave, so that the zero crossings correspond to the voltage zero crossing. The phase comparison and/or frequency comparison can also be implemented outside the ECU and fed to the ECU via a PWM (pulse width modulation) input.

LIST OF REFERENCES

100 power grid, in particular electrical supply grid
100.1 connection link
101 connection point, load switch
102 generator set, Genset—generator set-complete system
BKM internal combustion engine
104 engine (Eng) of internal combustion engine BKM
104.1 drive train

104.2 engine signal
106 generator
SyncGen synchronous generator 106.1 with transducer and/or transformer
108 generator set controller with control command, GenCtrl
108.1 excitation
108.2 speed control signal with speed control command $C_S$
108.3 switch control signal, load switch
110 electronic control unit (ECU)
110.1 injection control signal with injection parameter $C_{In}$
$f_G$ generator voltage frequency
$\Phi_G$, $P_G$ generator voltage phase
$U_G$ generator voltage
$f_n$ grid frequency
$\Phi_N$, $P_N$ grid voltage phase
$U_N$ grid voltage
$n_M$ engine speed
$\Phi_M$ engine phase
NG generator set speed
P power
RCM speed control mode of a speed controller 150 in step 502
PCM phase control mode by phase regulator 704 in step 404
150 speed controller with speed control RCM
152 speed converter (RotConv)
154 speed controller (ECU, RotConv)
200 progression of engine speed and engine power
202 time
204 unit
206 engine power
208 engine speed
T1, T2, T3, T4, T5 points in time
300 generator set, Genset
302 device
304 comparison unit (Phase Det)
306 adjustment value (ΔΦ) phase or frequency difference
308 pilot control unit (ECU, PLL, Ctrl)
310 injection control signal
312 engine
314 generator
SyncGen synchronous generator
316 generator voltage $U_G$
318 grid current
PM engine phase
350 functional dependency for pulse width
352 pulse width function
360 pulse width
362 phase difference/frequency difference according to adjustment value (ΔΦ) phase or frequency difference
400 method
402 starting point
404 step, phase control mode PCM
406 step, determine grid voltage phase and generator voltage phase
408 step, compare grid voltage phase with generator voltage phase
410 step, injection parameter subject to adjustment value
412 stopping point
500 method
502 step, speed control mode RCM
504 branching element
506 step, speed specification in text step
508 step, converting speed specification into injection parameter
600 method
602 determining parameters in text step
604 recording of parameters in text connection
702 generator set
704 phase regulator with phase control PCM
706 synchronization detector (SyncDet)
708 converter unit (Conv)
710 timer
712 switch
800 progression of engine parameters
806 engine speed
808 engine power
810 start segment
812 ramp-up segment
814 synchronization segment
816 load switching segment
818 arrow, reducing time span by way of phase regulating While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for operating a generator set with respect to a power grid operated at a grid voltage, the method comprising the steps of:

providing that the generator set includes a generator, an internal combustion engine, and a generator set controller, the internal combustion engine including an engine, an electronic control unit, and a combustion actuator which is control-connected to the electronic control unit and which is configured for being controlled using a combustion control variable for a torque-forming combustion adjustment of the engine, the generator being configured such that the generator, at a generator rotational speed, is drive-connected to the engine, at an engine rotational speed, so as to generate a generator voltage at a generator voltage frequency at the generator, the grid voltage having assigned thereto a grid frequency and a grid voltage phase, the generator voltage having assigned thereto the generator voltage frequency and a generator voltage phase;

operating in a synchronized manner the generator set with respect to the power grid, the operating in the synchronized manner including the steps of:

synchronizing the generator voltage with respect to the grid voltage;

matching at least one of the generator voltage frequency and the generator voltage phase of the generator voltage generated by the generator with respect to at least one of the grid frequency and the grid voltage phase;

operating the generator set in a synchronization mode so as to synchronize the generator voltage phase with the grid voltage phase, and the engine of the internal combustion engine being adjusted during operation;

operating the engine of the internal combustion engine in a phase control mode with adjustment of an engine phase to change the generator voltage phase;

transmitting the grid voltage phase to a phase regulator, the electronic unit being an engine control unit, which includes the phase regulator;

regulating, by the phase regulator, the engine phase to a phase difference, which is formed by a difference between the generator voltage phase and the grid voltage phase; and setting a phase parameter formed as the combustion control variable for a torque-forming combustion setting of the engine, so as to adjust the engine phase subject to the phase difference, wherein at least one of the generator voltage frequency and the generator voltage phase for determining the phase difference is calculated—and thus not sensed—from at least one of the engine phase and the engine rotational speed of the engine of the internal combustion engine.

2. The method according to claim 1, wherein the combustion control variable for the torque-forming combustion setting of the engine is selected from the group consisting of: a fuel injection control variable; a gas injection control variable; and a throttle valve control variable.

3. The method according to claim 1, wherein the generator is a synchronous generator.

4. The method according to claim 1, wherein the engine phase is determined using a phase position of a crankshaft.

5. The method according to claim 1, wherein at least one of the generator voltage frequency and the generator voltage phase are calculated from at least one of the engine rotational speed and the engine phase, taking into account at least one of: (a) a number of pole pairs of the generator; and (b) a mechanical blocking angle between the internal combustion engine and the generator.

6. The method according to claim 1, wherein specifying at least one of the generator voltage frequency and the generator voltage phase of the generator voltage is subject to a generator set speed during operation of the internal combustion engine.

7. The method according to claim 6, wherein at least one of:

(a) in a speed control mode, the engine of the internal combustion engine is operated by adapting the engine rotational speed, whereby the generator set speed is controlled; and (b) in the synchronization mode, the grid voltage phase is transmitted to the phase regulator in a phase-control mode, wherein the engine of the internal combustion engine is operated by adjusting the engine phase to change the generator voltage phase.

8. The method according to claim 6, wherein the engine is operated in the phase control mode by adapting the engine rotational speed by changing the engine phase according to the phase difference, which results from a comparison of the generator changing the engine phase to minimize the phase difference, thereby controlling the generator set speed.

9. The method according to claim 1, wherein at least one of:

(a) the generator set is configured for being operated in a speed control mode as an alternative to the phase control mode in the synchronization mode; and (b) the generator set is configured for being operated in the phase control mode in the synchronization mode and subsequently in a speed control mode, then the internal combustion engine is switched to the speed control mode for synchronization.

10. The method according to claim 1, wherein the phase regulator is a part of the electronic control unit, and the grid voltage phase is transmitted to the electronic control unit in the phase control mode.

11. The method according to claim 1, wherein at least one of:

(a) a generator voltage frequency, which differs initially in a frequency difference from the grid frequency, is adjusted to the grid frequency; and (b) the generator voltage phase, which initially differs from the grid voltage phase in the phase difference, is adapted to the grid voltage phase.

12. The method according to claim 1, wherein the phase difference for a phase-locked state between the generator voltage frequency and the grid frequency is specified in the synchronization mode.

13. The method according to claim 1, wherein at least one of (i) a frequency difference as a frequency adjustment value indicates a difference between the generator voltage frequency and the grid frequency and (ii) the phase difference as a phase adjustment value indicates a difference between the generator voltage phase and the grid voltage phase for specifying the phase parameter formed as the combustion control variable for the torque-forming combustion adjustment of the engine in at least one of a frequency and a phase control loop of the phase regulator.

14. The method according to claim 1, wherein a phase signal which follows a strictly monotonic transfer function of the phase difference between the generator voltage phase and the grid voltage phase is made available to the phase regulator at an input.

15. The method according to claim 1, wherein the phase parameter formed as the combustion control variable for the torque-forming combustion adjustment of the engine:

(a) subject to a frequency difference is specified such that the frequency difference is minimized; and (b) to adapt the engine phase subject to the phase difference is specified such that the phase difference is minimized.

16. The method according to claim 1, wherein, in the synchronization mode, the rotational engine speed is first changed by ramping up from a starting speed of the engine until the generator voltage frequency and the grid frequency coincide, and then the generator set is operated in the synchronization mode to synchronize the generator voltage phase with the grid voltage phase.

17. The method according to claim 1, wherein, from a speed control mode for a case of a synchronized operation of the internal combustion engine, a blocking angle is learned which indicates a difference between an engine rotation angle and a rotor angle of the generator.

18. The method according to claim 1, wherein the generator set produces the generator voltage with the result that the generator set is prepared at least one of to supply and to feed an electrical power (P) to the power grid.

19. A device for operating a generator set with respect to a power grid operated at a grid voltage, the generator set including a generator, an internal combustion engine, and a generator set controller, the device comprising:

a generator sensor system configured for specifying a generator voltage frequency and a generator voltage phase of a generator voltage which is generated by the generator and to which are assigned the generator voltage frequency and the generator voltage phase;

a grid sensor configured for specifying the grid voltage to which a grid frequency and a grid voltage phase are assigned;

a control and regulating device configured for synchronizing the generator voltage with respect to the grid voltage, the control and regulating device being configured for carrying out a method for operating the generator set with respect to the power grid operated at the grid voltage, the method including the steps of:

providing that the generator set includes the generator, the internal combustion engine, and the generator set controller, the internal combustion engine including an engine, an electronic control unit, and a combustion actuator which is control-connected to the electronic control unit and which is configured for being controlled using a combustion control variable for a torque-forming combustion adjustment of the engine, the generator being configured such that the generator, at a generator rotational speed, is drive-connected to the engine, at an engine rotational speed, so as to generate the generator voltage at the generator voltage frequency at the generator, the grid voltage having assigned thereto the grid frequency and the grid voltage phase, the generator voltage having assigned thereto the generator voltage frequency and the generator voltage phase;

operating in a synchronized manner the generator set with respect to the power grid, the step of operating in the synchronized manner including the steps of:

synchronizing the generator voltage with respect to the grid voltage;

matching at least one of the generator voltage frequency and the generator voltage phase of the generator voltage generated by the generator with respect to at least one of the grid frequency and the grid voltage phase;

operating the generator set in a synchronization mode so as to synchronize the generator voltage phase with the grid voltage phase, and the engine of the internal combustion engine being adjusted during operation;

operating the engine of the internal combustion engine in a phase control mode with adjustment of an engine phase to change the generator voltage phase;

transmitting the grid voltage phase to a phase regulator, the electronic unit being an engine control unit, which includes the phase regulator;

regulating, by the phase regulator, the engine phase to a phase difference, which is formed by a difference between the generator voltage phase and the grid voltage phase; and setting a phase parameter formed as the combustion control variable for a torque-forming combustion setting of the engine, so as to adjust the engine phase subject to the phase difference, wherein at least one of the generator voltage frequency and the generator voltage phase for determining the phase difference is calculated—and thus not sensed—from at least one of the engine phase and the engine rotational speed of the engine of the internal combustion engine.

20. A generator set, which is configured for being operated with respect to a power grid operated at a grid voltage, the generator set comprising:

an internal combustion engine, the internal combustion engine including an engine, an electronic control unit, and a combustion actuator which is control-connected to the electronic control unit and which is configured for being controlled using a combustion control variable for a torque-forming combustion adjustment of the engine;

a generator, the generator being configured such that the generator, at a generator rotational speed, is drive-connected to the engine, at an engine rotational speed, so as to generate a generator voltage at a generator voltage frequency at the generator, the grid voltage having assigned thereto a grid frequency and a grid voltage phase, the generator voltage having assigned thereto the generator voltage frequency and a generator voltage phase, the generator being configured such that at least one of the generator voltage frequency and the generator voltage phase of the generator voltage generated by the generator being adapted with respect to at least one of the grid frequency and the grid voltage phase;

a generator set controller; and a device configured for operating the generator set with respect to the power grid operated at the grid voltage, wherein:

the generator set is configured for synchronized operation with respect to the power grid so as to synchronize the generator voltage with respect to the grid voltage, the generator set is configured for being operated in a synchronization mode for synchronizing the generator voltage phase with the grid voltage phase, the engine of the internal combustion engine is configured for being adjusted during operation, the engine of the internal combustion engine is configured for being operated in a phase control mode by adapting an engine phase to change the generator voltage phase, the generator set includes a phase regulator and is configured such that the grid voltage phase is transmitted to the phase regulator, the phase regulator is configured for regulating the engine phase to a phase difference which is formed from a difference between the generator voltage phase and the grid voltage phase, the generator set is configured such that a phase parameter formed as the combustion control variable is set for a torque-forming combustion setting of the engine to adjust the engine phase subject to the phase difference, wherein the device includes:

a generator sensor system configured for specifying the generator voltage frequency and the generator voltage phase of the generator voltage which is generated by the generator and to which are assigned the generator voltage frequency and the generator voltage phase;

a grid sensor configured for specifying the grid voltage to which the grid frequency and the grid voltage phase are assigned;

a control and regulating device configured for synchronizing the generator voltage with respect to the grid voltage, the control and regulating device being configured for carrying out a method for operating the generator set with respect to the power grid operated at the grid voltage, the method including the steps of:

providing the generator set;

operating in a synchronized manner the generator set with respect to the power grid, the step of operating in the synchronized manner including the steps of:

synchronizing the generator voltage with respect to the grid voltage;

matching at least one of the generator voltage frequency and the generator voltage phase of the generator voltage generated by the generator with respect to at least one of the grid frequency and the grid voltage phase;

operating the generator set in the synchronization mode so as to synchronize the generator voltage phase with the grid voltage phase, and the engine of the internal combustion engine being adjusted during operation;

operating the engine of the internal combustion engine in the phase control mode with adjustment of the engine phase to change the generator voltage phase;

transmitting the grid voltage phase to the phase regulator, the electronic unit being an engine control unit, which includes the phase regulator;

regulating, by the phase regulator, the engine phase to the phase difference (PD), which is formed by the difference between the generator voltage phase and the grid voltage phase; and setting the phase parameter formed as the combustion control variable for the torque-forming combustion setting of the engine, so as to adjust the engine phase subject to the phase difference, wherein at least one of the generator voltage frequency and the generator voltage phase for determining the phase difference is calculated—and thus not sensed—from at least one of the engine phase and the engine rotational speed of the engine of the internal combustion engine.

21. The generator set according to claim 20, wherein the combustion actuator, which is connected to the electronic control unit and which is configured for being controlled using the combustion control variable for the torque-forming combustion adjustment of the engine, includes a fuel allocation device formed as at least one of an injector, an injection device, a throttle device, and an ignition device.

22. The generator set according to claim 20, further including a drive shaft, wherein the engine is connected to the generator in a torque-transmitting manner via the drive shaft, wherein the generator includes a rotor and a stator, and wherein the generator set is configured such that during operation of the internal combustion engine the rotor is rotationally driven relative to the stator so as to generate the generator voltage at the generator voltage frequency.

* * * * *